United States Patent
Seo et al.

(10) Patent No.: US 12,382,469 B2
(45) Date of Patent: *Aug. 5, 2025

(54) BWP ACTIVATION METHOD FOR TERMINAL

(71) Applicant: LG Electronics Inc., Seoul (KR)

(72) Inventors: Inkwon Seo, Seoul (KR); Joonkui Ahn, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,708

(22) Filed: May 26, 2023

(65) Prior Publication Data

US 2023/0309104 A1 Sep. 28, 2023

Related U.S. Application Data

(63) Continuation of application No. 17/711,366, filed on Apr. 1, 2022, now Pat. No. 11,706,782, which is a continuation of application No. PCT/KR2020/011700, filed on Sep. 1, 2020.

(60) Provisional application No. 62/932,607, filed on Nov. 8, 2019.

(30) Foreign Application Priority Data

Oct. 17, 2019 (KR) .......................... 10-2019-0129283
Nov. 6, 2019 (KR) .......................... 10-2019-0141015

(51) Int. Cl.
*H04W 72/23* (2023.01)

(52) U.S. Cl.
CPC .................................. *H04W 72/23* (2023.01)

(58) Field of Classification Search
CPC . H04W 36/0016; H04W 36/06; H04W 76/38; H04W 76/27; H04W 72/042
See application file for complete search history.

(56) References Cited

U.S. PATENT DOCUMENTS

| 2019/0045491 A1 | 2/2019 | Zhang et al. |
| 2019/0124558 A1* | 4/2019 | Ang ...................... H04W 36/06 |
| 2019/0254110 A1 | 8/2019 | He et al. |
| 2020/0092814 A1* | 3/2020 | Zhou ................. H04W 52/0235 |
| 2020/0314816 A1* | 10/2020 | Yi ...................... H04W 28/0236 |

(Continued)

FOREIGN PATENT DOCUMENTS

| KR | 10-2019-0111767 | 10/2019 |
| WO | WO 2019/078363 | 4/2019 |

(Continued)

OTHER PUBLICATIONS

Office Action in Chinese Appln. No. 202080071987.X, mailed on Jul. 7, 2023, 22 pages (with English translation).

(Continued)

*Primary Examiner* — Andrew Lee
(74) *Attorney, Agent, or Firm* — Fish & Richardson P.C.

(57) ABSTRACT

The present disclosure provides a method and an apparatus, wherein a terminal, for which a primary cell and a secondary cell are configured, performs a random access procedure, and a specific BWP on the secondary cell is activated on the basis that DCI received from a base station indicates non-dormancy.

15 Claims, 32 Drawing Sheets

(56) References Cited

U.S. PATENT DOCUMENTS

| | | | | |
|---|---|---|---|---|
| 2021/0029772 | A1* | 1/2021 | Islam | H04W 72/23 |
| 2021/0377852 | A1* | 12/2021 | Zhou | H04W 52/0206 |
| 2022/0167358 | A1* | 5/2022 | Cheng | H04W 72/542 |

FOREIGN PATENT DOCUMENTS

| | | |
|---|---|---|
| WO | WO 2019/098156 | 5/2019 |
| WO | WO 2019/139411 | 7/2019 |

OTHER PUBLICATIONS

Office Action in Japanese Appln. No. 2022-522611, mailed on Jun. 6, 2023, 10 pages (with English translation).

Qualcomm Incorporated, "Open Issues on BWP," 3GPP TSG RAN WG1 #90bis, R1-1718580, Prague, Czech Republic, Oct. 9-13, 2017, 8 pages.

\* cited by examiner

BWP ACTIVATION METHOD FOR TERMINAL

CROSS-REFERENCE TO RELATED APPLICATIONS

This application is a continuation of U.S. application Ser. No. 17/711,366, filed on Apr. 1, 2022, which is a continuation pursuant to 35 U.S.C. § 119(e) of International Application PCT/KR2020/011700, with an international filing date of Sep. 1, 2020, which claims the benefit of U.S. Provisional Patent Application No. 62/932,607, filed on Nov. 8, 2019, Korean Patent Application No. 10-2019-0129283, filed on Oct. 17, 2019, and Korean Patent Application No. 10-2019-0141015, filed on Nov. 6, 2019, the contents of which are hereby incorporated by reference herein in their entirety.

BACKGROUND OF THE DISCLOSURE

Field of the Disclosure

The present disclosure relates to wireless communication.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or user equipments (UEs) sensitive to reliability and latency are under discussion. Introduction of next-generation RAT considering enhanced mobile broadband communication, massive MTC, and ultra-reliable and low-latency communication (URLLC) is under discussion. In the disclosure, for convenience of description, this technology may be referred to as new RAT or new radio (NR).

In the LTE system, a dormant state is defined in order to rapidly perform activation/deactivation of a secondary cell (SCell), and when a specific SCell is set to a dormant state, a UE may not monitor a PDCCH for the cell. Thereafter, in order to rapidly activate the corresponding SCell, it is defined that measurement and reporting are performed in the dormant state to monitor the channel condition and link status of the corresponding cell. For example, when a specific SCell is set to a dormant state, a UE does not perform PDCCH monitoring but may perform measurement and reporting for channel state information (CSI)/radio resource management (RRM). In the NR system, the aforementioned dormant state or a dormancy behavior may be defined in units of BWP.

SUMMARY

The present disclosure provides a bandwidth part (BWP) activation method of a terminal.

Advantageous Effects

According to the present disclosure, a BWP activation method of a terminal in consideration of power saving of the terminal is provided.

Effects obtained through specific examples of this specification are not limited to the foregoing effects. For example, there may be a variety of technical effects that a person having ordinary skill in the related art can understand or derive from this specification. Accordingly, specific effects of the disclosure are not limited to those explicitly indicated herein but may include various effects that may be understood or derived from technical features of the disclosure.

DESCRIPTION OF EXEMPLARY EMBODIMENTS

Figure 1:
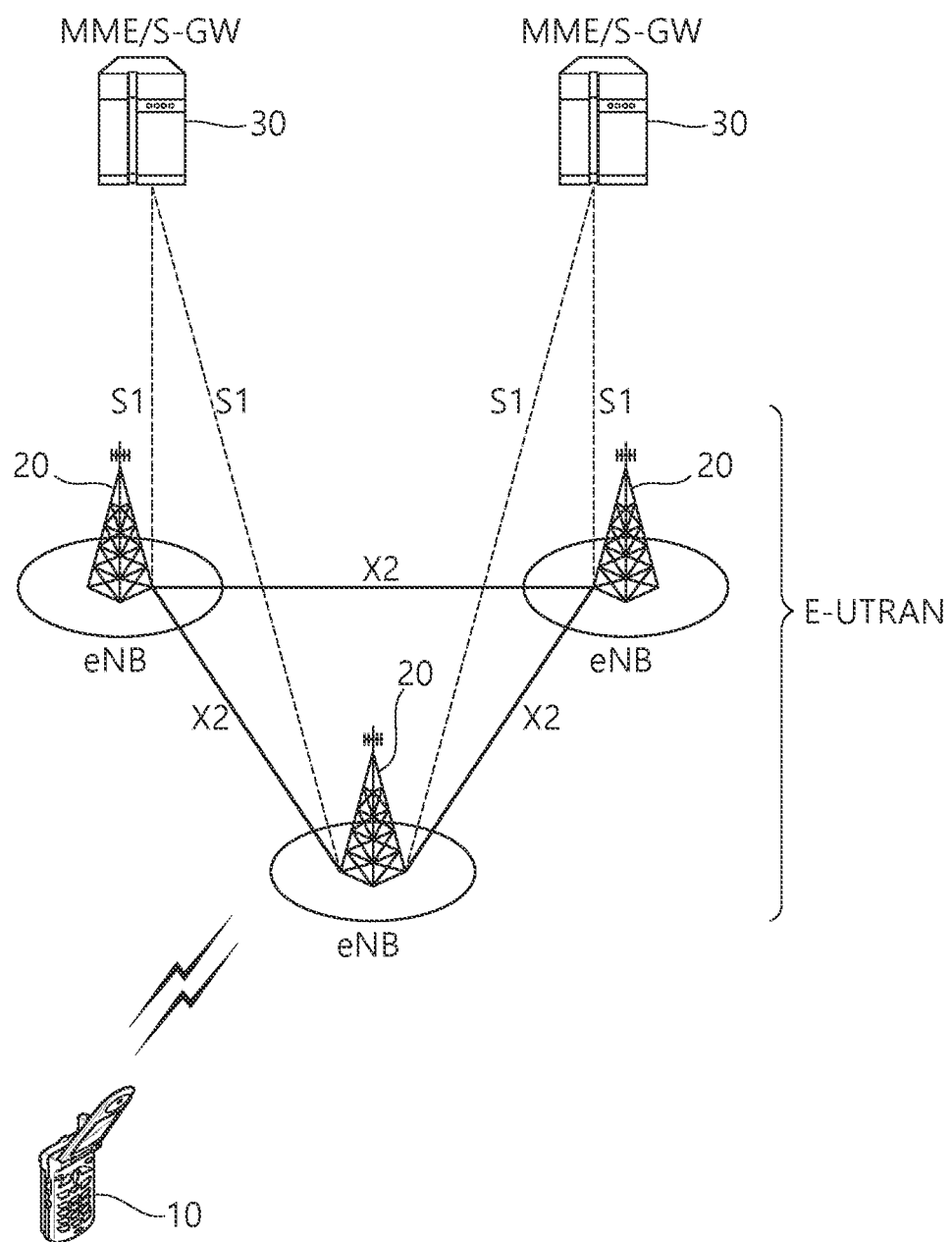
FIG. 1 shows a wireless communication system to which the present disclosure may be applied.

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
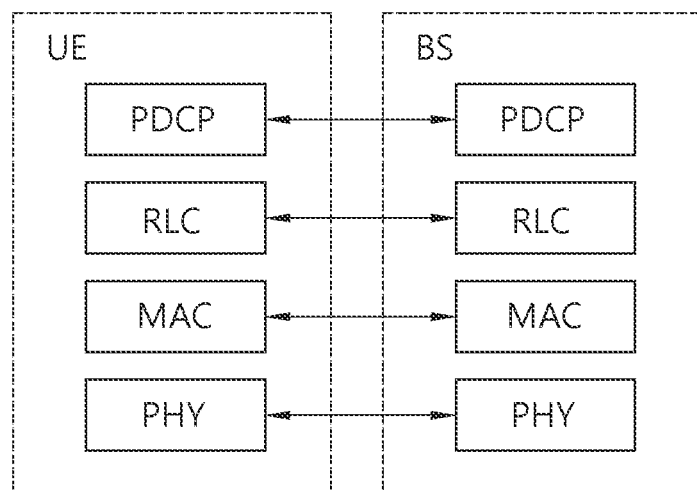
FIG. 2 is a diagram showing a wireless protocol architecture for a user plane.
Figure 3:
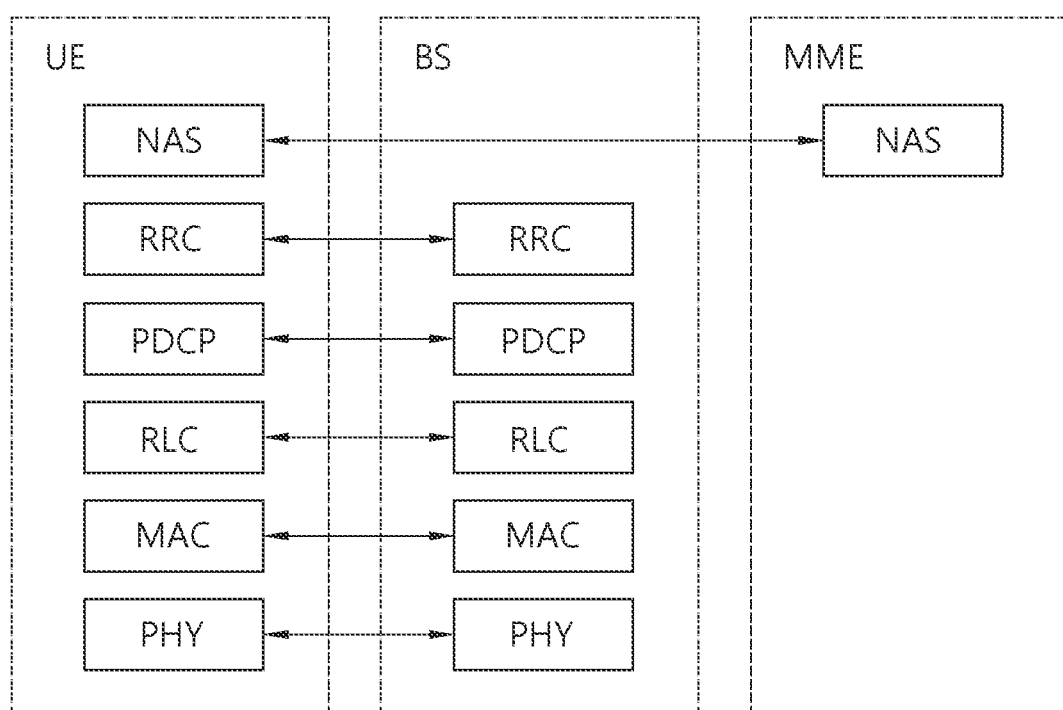
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QOS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time (e.g., slot, symbol) for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
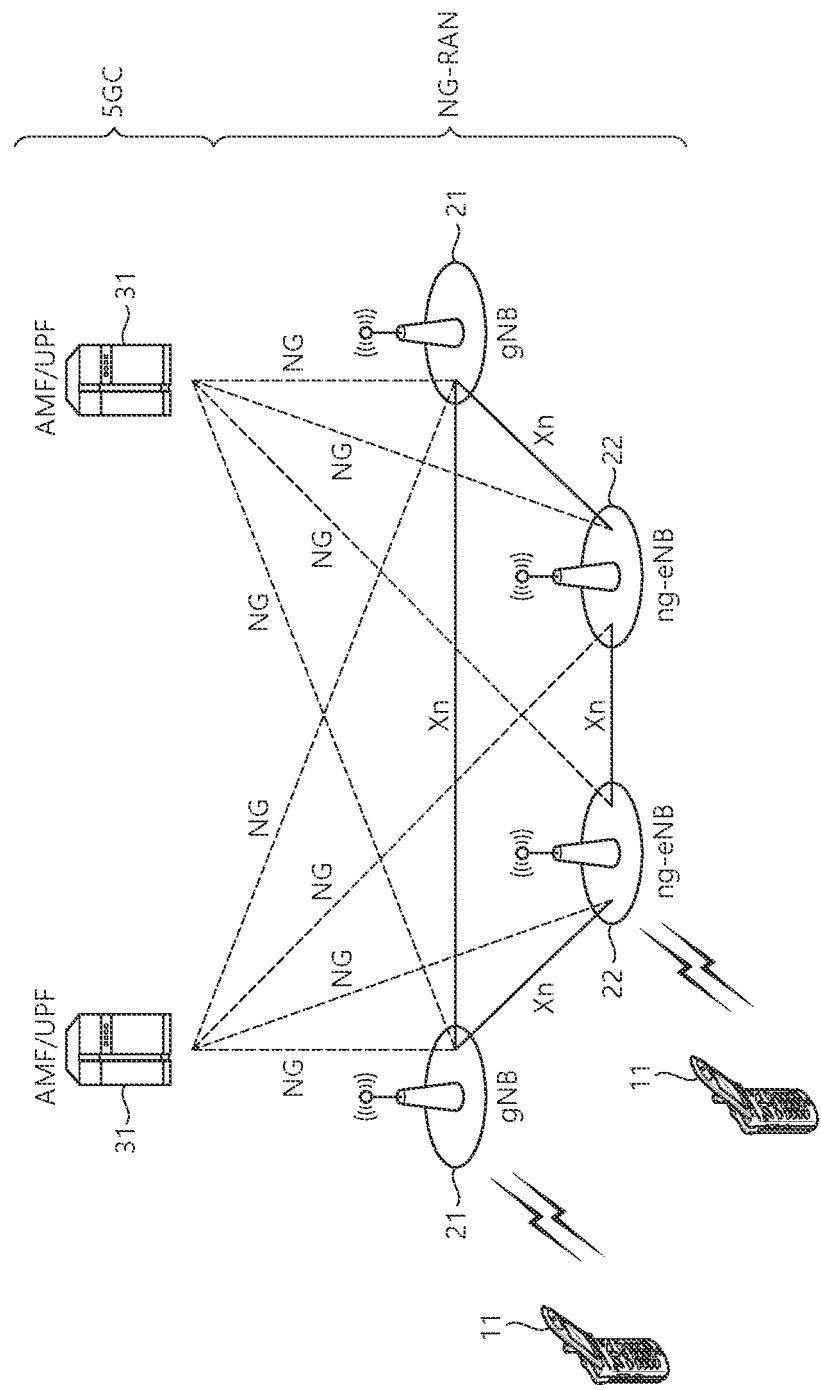
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE (11). The gNB (21) and the eNB (ng-eNB, 22) are connected by an Xn interface. The gNB and the eNB are connected to a 5G core network (5GC) via an NG interface. More specifically, the gNB and the eNB may be connected to an access and mobility management function (AMF, 31) via an NG-C interface and connected to a user plane function (UPF, 31) via an NG-U interface.

Figure 5:
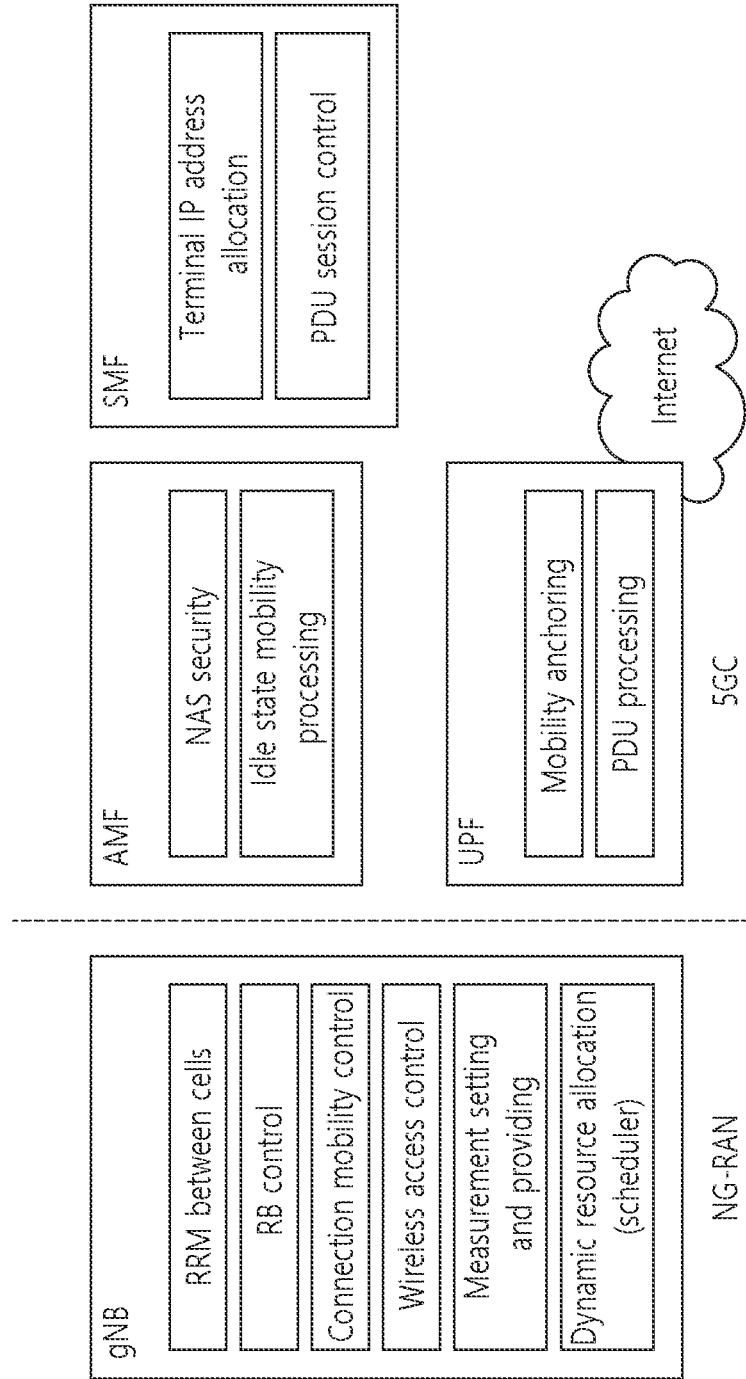
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
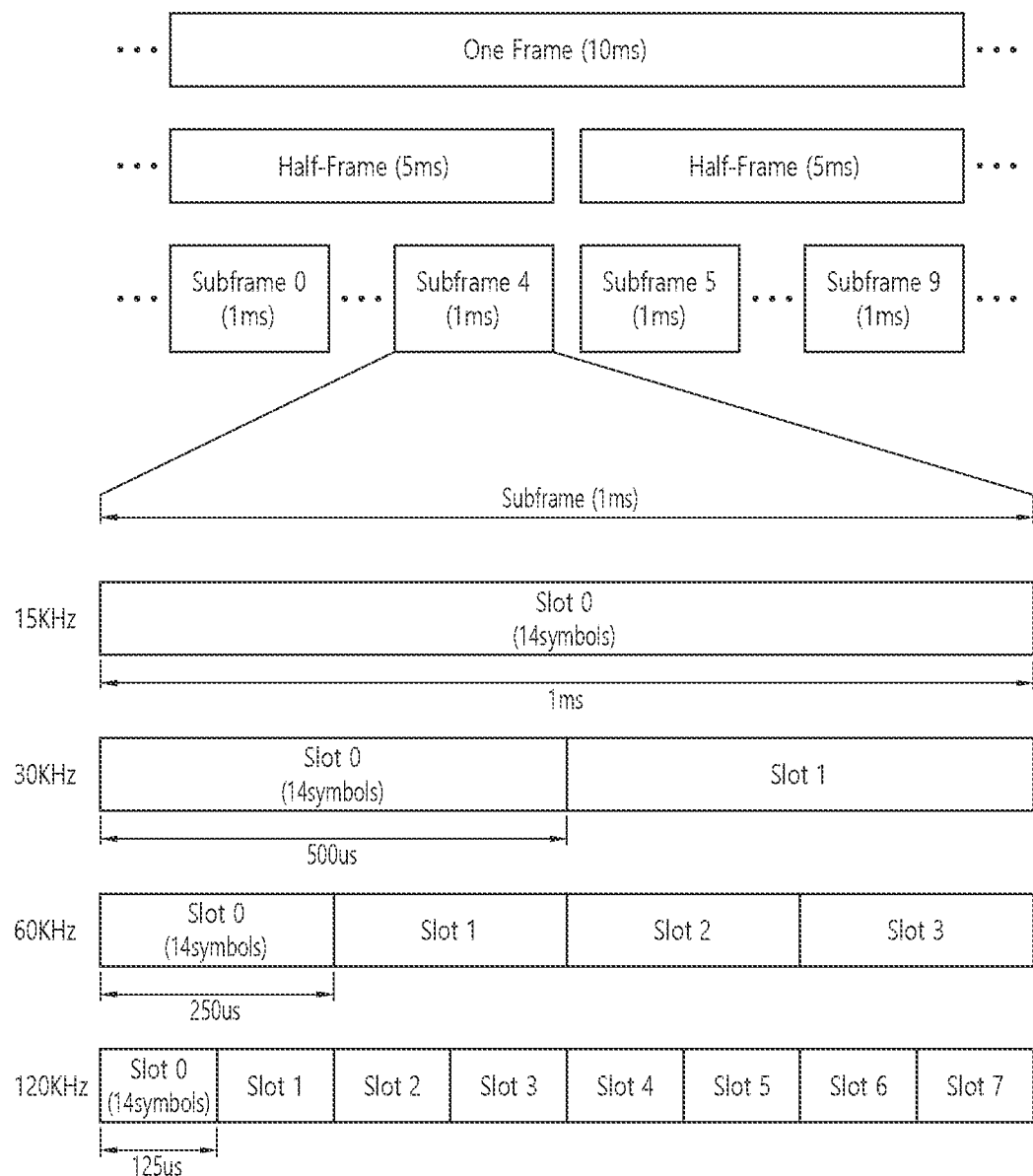
FIG. 6 illustrates an example of a frame structure that may be applied in NR.

FIG. 6 illustrates an example of a frame structure that may be applied in NR.

Referring to FIG. 6, a radio frame (which may be called as a frame hereinafter) may be used for uplink and downlink transmission in NR. A frame has a length of 10 ms and may be defined as two 5 ms half-frames (Half-Frame, HF). A half-frame may be defined as five 1 ms subframes (Subframe, SF). A subframe may be divided into one or more slots, and the number of slots in a subframe depends on subcarrier spacing (SCS). Each slot includes 12 or 14 OFDM (A) symbols according to a cyclic prefix (CP). When a normal CP is used, each slot includes 14 symbols. When an extended CP is used, each slot includes 12 symbols. Here, the symbol may include an OFDM symbol (or a CP-OFDM symbol) and an SC-FDMA symbol (or a DFT-s-OFDM symbol).

The following table 1 illustrates a subcarrier spacing configuration u.

TABLE 1

| $\mu$ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal |
|   |   | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations u.

TABLE 2

| $\mu$ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, $\mu=0, 1, 2$, and 3 are exemplified.

Table 3 below illustrates that the number of symbols per slot, the number of slots per frame, and the number of slots per subframe vary depending on the SCS, in case of using an extended CP.

TABLE 3

| SCS(15*2^ $\mu$) | $N^{slot}_{symb}$ | $N^{frame,\mu}_{slot}$ | $N^{subframe,\mu}_{slot}$ |
| --- | --- | --- | --- |
| 60 KHz ($\mu = 2$) | 12 | 40 | 4 |

In an NR system, OFDM (A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
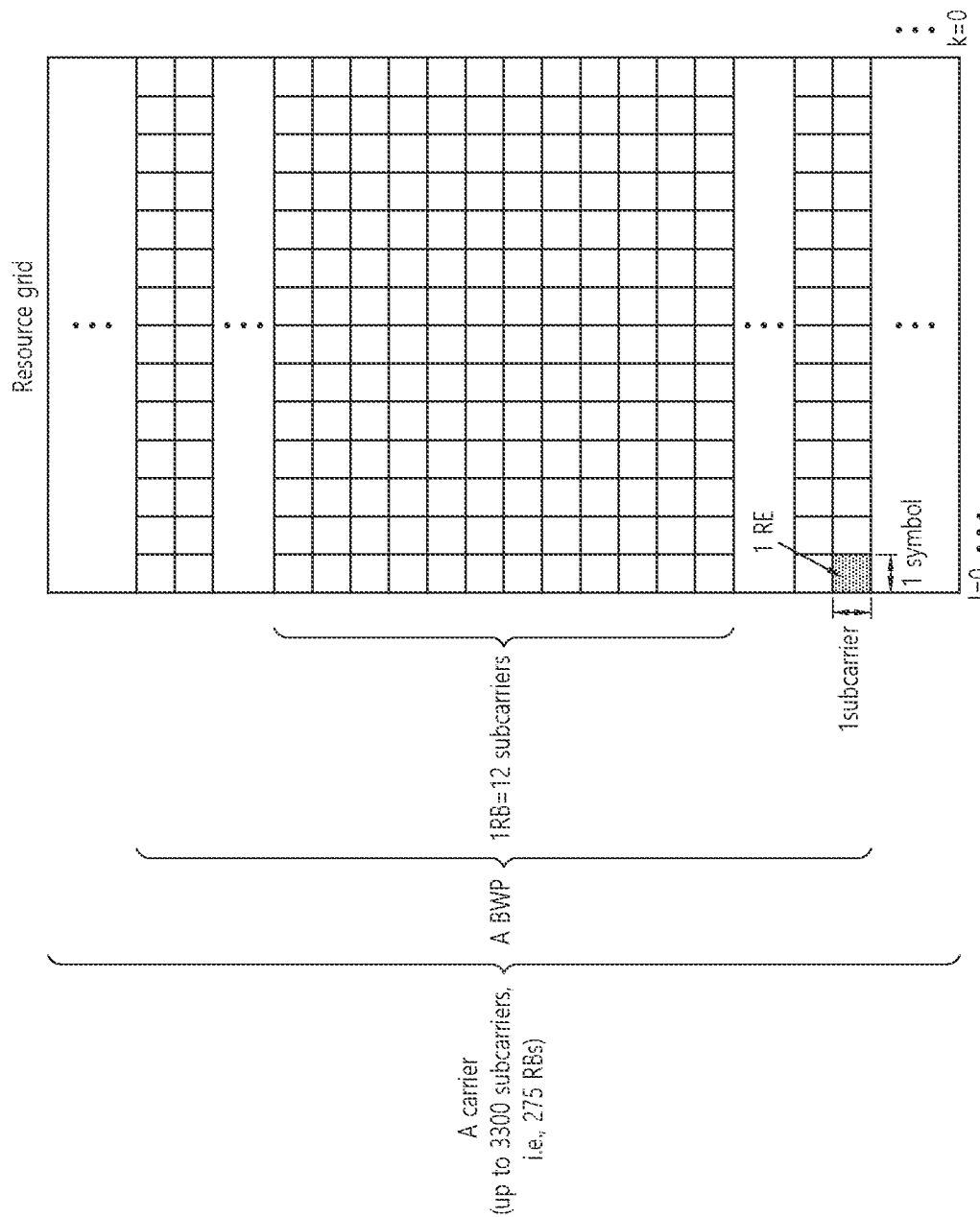
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P) RBs in the frequency domain, and the BWP may correspond to one numerology (e.g., SCS, CP length, and so on). The carrier ma include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 4.

TABLE 4

| Aggregation level | Number of CCEs |
|---|---|
| 1 | 1 |
| 2 | 2 |
| 4 | 4 |
| 8 | 8 |
| 16 | 16 |

That is, PDCCH may be transmitted through a resource configured with 1, 2, 4, 8, or, 16 CCE(s). Here, the CCE is configured with 6 REGs (resource element groups), and one REG is configured with one resource block in a frequency domain and one OFDM (orthogonal frequency division multiplexing) symbol in a time domain.

Monitoring means decoding each PDCCH candidate according to a downlink control information (DCI) format. The UE monitors a set of PDCCH candidates in one or more CORESETs (described below) on the activated DL BWP of each activated serving cell for which PDCCH monitoring is configured according to a corresponding search space set.

A new unit called a control resource set (CORESET) may be introduced in the NR. The UE may receive a PDCCH in the CORESET.

Figure 8:
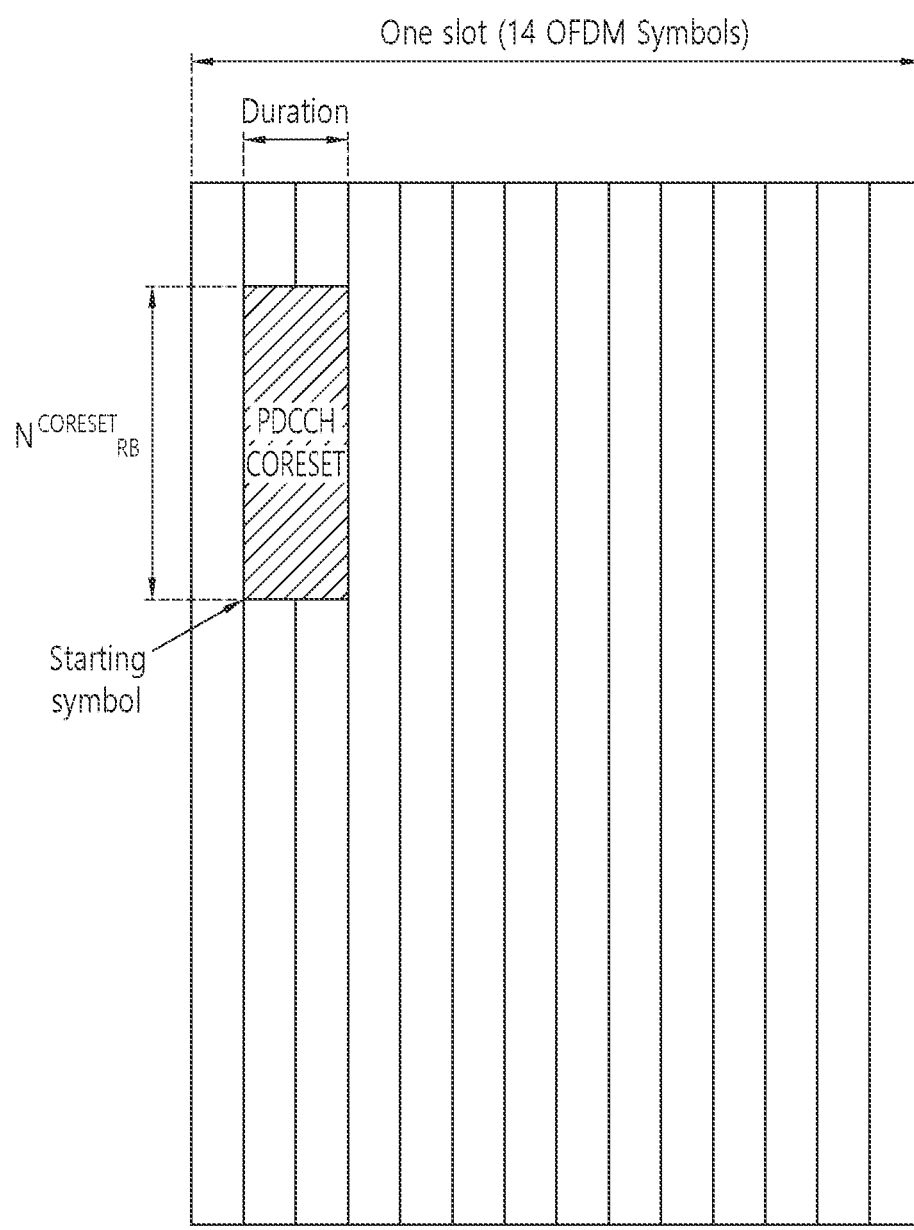
FIG. 8 illustrates a CORESET.

FIG. 8 illustrates a CORESET.

Referring to FIG. 8, the CORESET includes $N^{CORESET}_{RB}$ resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET. One CCE may be composed of a plurality of resource element groups (REGs), and one REG may include one OFDM symbol in the time domain and 12 resource elements in the frequency domain.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
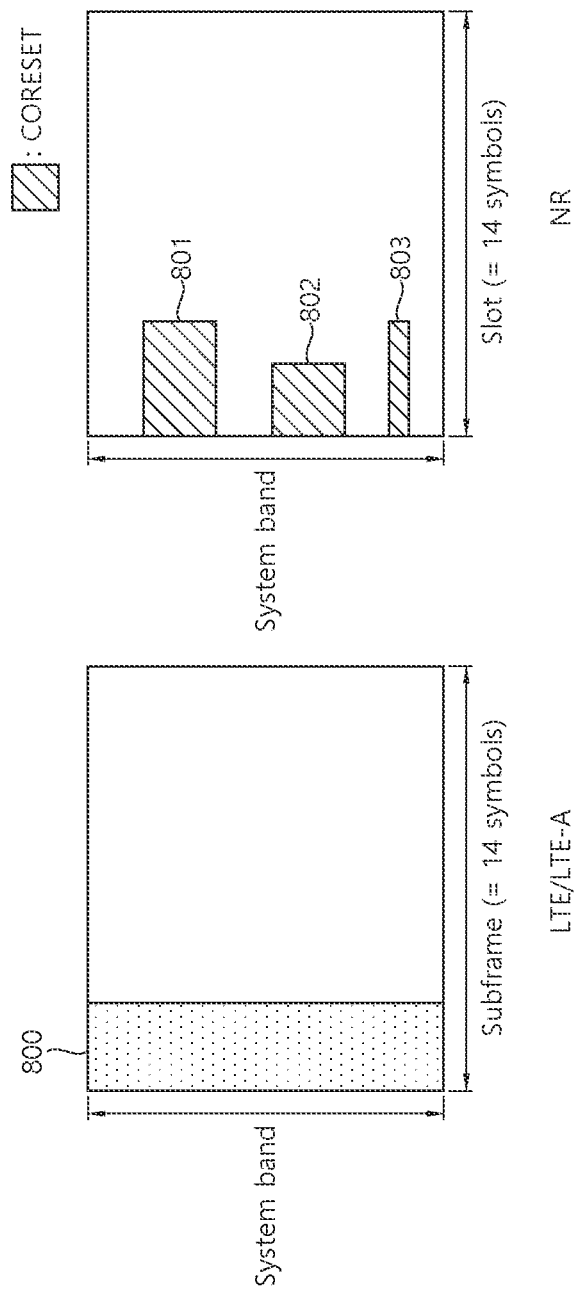
FIG. 9 is a diagram illustrating a difference between a conventional control region and the CORESET in NR.

FIG. 9 is a diagram illustrating a difference between a conventional control region and the CORESET in NR.

Referring to FIG. 9, a control region 800 in the conventional wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth in the frequency domain. In addition, in the time domain, only some of the symbols in the slot may be used. The BS may allocate the CORESET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
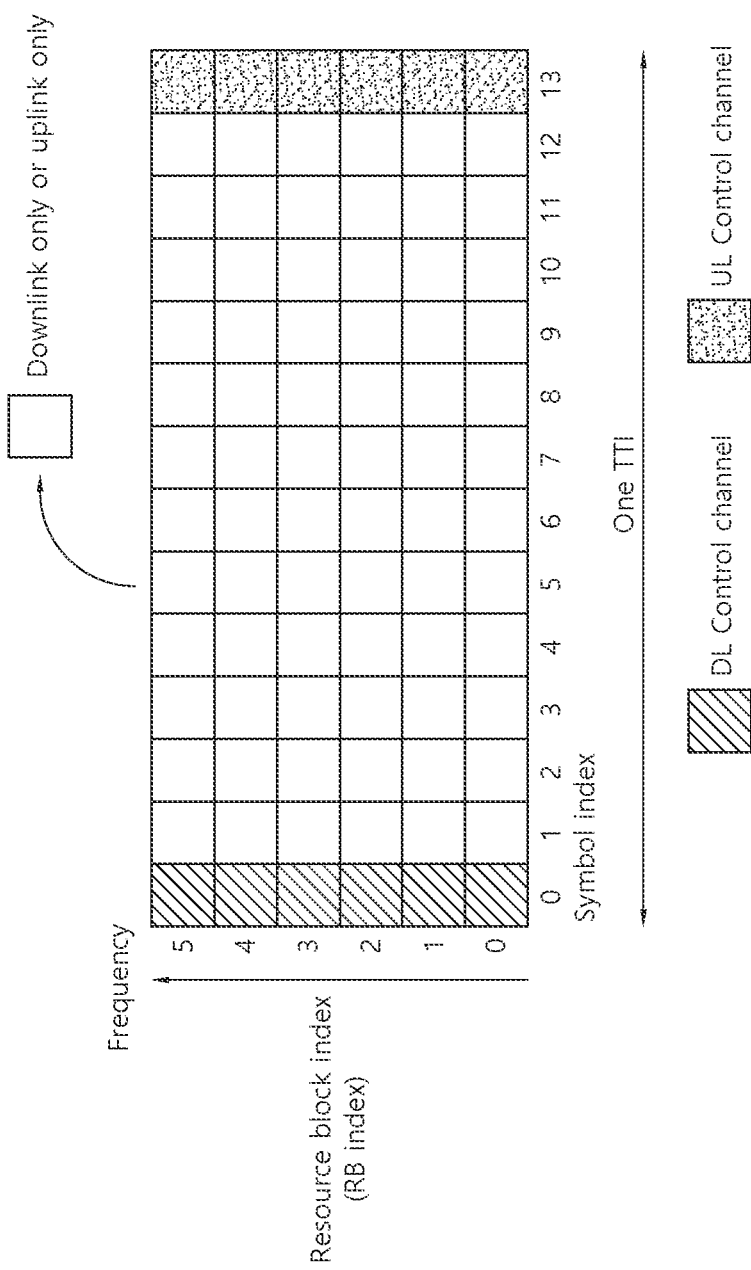
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
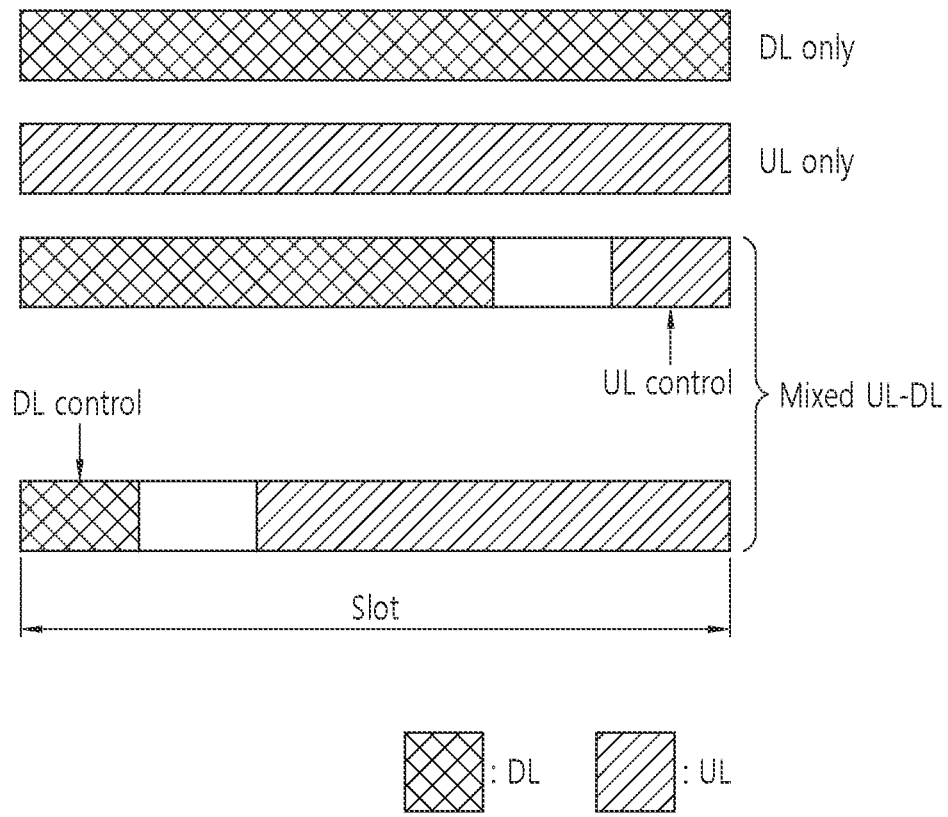
FIG. 11 illustrates a structure of self-contained slot.

FIG. 11 illustrates a structure of self-contained slot.

In NR system, one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data. As one example, one slot may correspond to one of the following configurations. Each period is listed in the time order.
1. DL only configuration
2. UL only configuration
3. Mixed UL-DL configuration
    DL region+GP (Guard Period)+UL control region
    DL control region+GP+UL region
    a DL region: (i) a DL data region, (ii) DL control region plus DL data region
    a UL region: (i) an UL data region, (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling information may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a primary synchronization signal (PSS), secondary synchronization signal (SSS), and a PBCH associated with demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, transmission and reception may be performed based on beams. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (e.g., one of 0 to 11, where index of each CORESET may be determined uniquely among BWPs of one serving cell),
2) PDCCH DM-RS scrambling sequence initialization value,
3) Duration of a CORESET in the time domain (which may be given in symbol units),
4) Resource block set,
5) CCE-to-REG mapping parameter,
6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'),
7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 5).

TABLE 5

| QCL Type | Description |
| --- | --- |
| QCL-TypeA | Doppler shift, Doppler spread, Average delay, Delay spread |
| QCL-TypeB | Doppler shift, Doppler spread |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDDCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
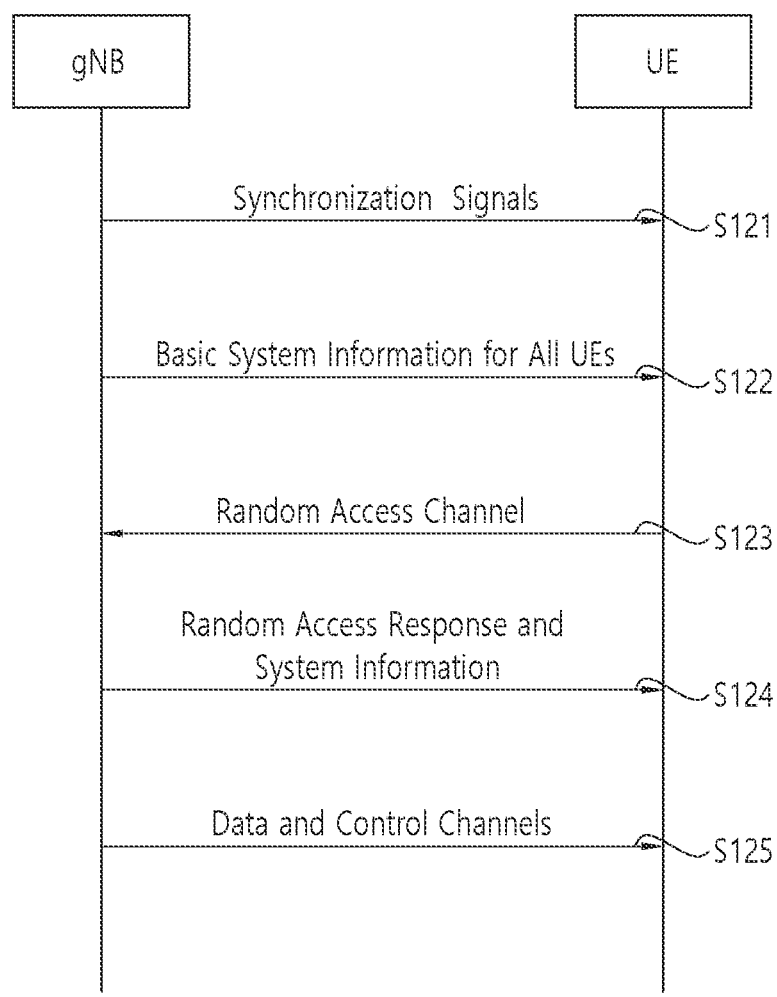
FIG. 12 illustrates an initial access process.

FIG. 12 illustrates an initial access process.

Referring to FIG. 12, the UE may perform synchronization with the base station by receiving a synchronization signal from the base station gNB (S121). The synchronization signal may include a primary synchronization signal (PSS) and a secondary synchronization signal (SSS). The synchronization signal may be transmitted together with a physical broadcast channel (PBCH), in this case, an SS/PBCH block may be configured. The UE may perform synchronization by receiving the SS/PBCH block. The UE receives basic system information from the base station (S122). The UE transmits the RACH preamble to the base station through a random access channel (S123), and receives a random access response (S124). Thereafter, the base station and the UE establish an RRC connection, and the UE may receive data and a control channel from the base station (S125).

Figure 13:
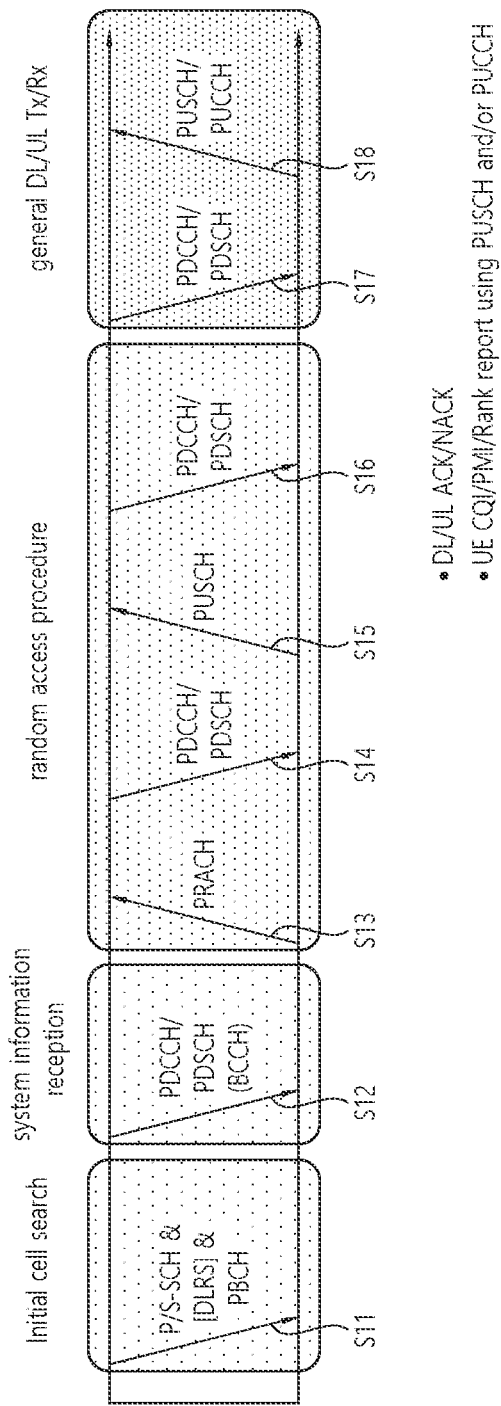
FIG. 13 illustrates in more detail the initial access and signal transmission in the subsequent process.

FIG. 13 illustrates in more detail the initial access and signal transmission in the subsequent process.

Referring to FIG. 13, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16). The above processes may be referred to as initial access.

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Figure 14:
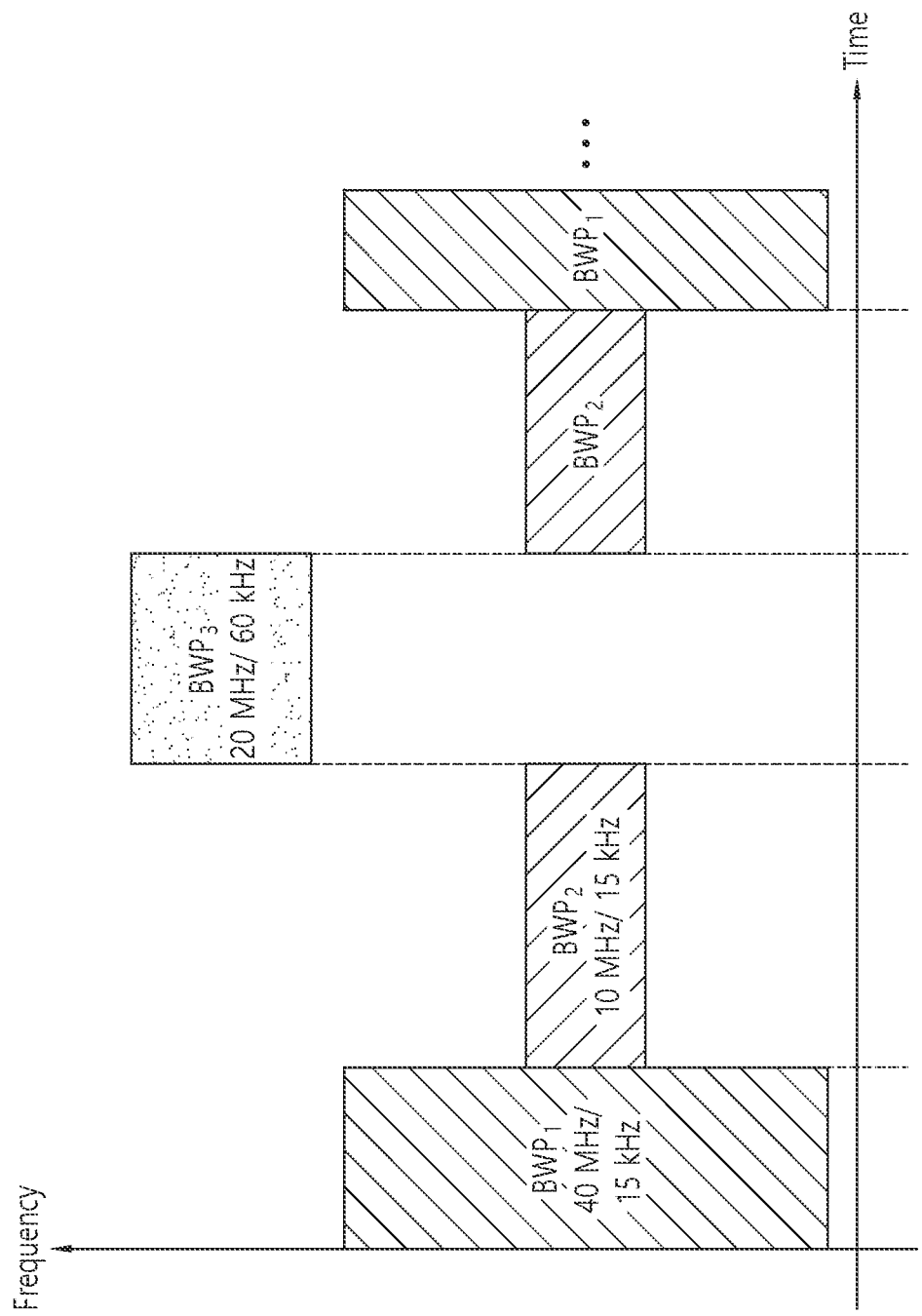
FIG. 14 illustrates a scenario in which three different bandwidth parts are configured.

FIG. 14 illustrates a scenario in which three different bandwidth parts are configured.

FIG. 14 shows an example in which BWP1, BWP2, and BWP3 are configured on a time-frequency resource. The BWP1 may have a width of 40 MHz and a subcarrier spacing of 15 kHz. The BWP2 may have a width of 10 MHz and a subcarrier spacing of 15 kHz. The BWP3 may have a width of 20 MHz and a subcarrier spacing of 60 kHz. In other words, each BWP may have a different width and/or a different subcarrier spacing.

Hereinafter, acquisition of system information will be described.

System information (SI) is divided into a master information block (MIB) and a plurality of system information blocks (SIBs) where:

the MIB is transmitted always on a BCH according to a period of 80 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
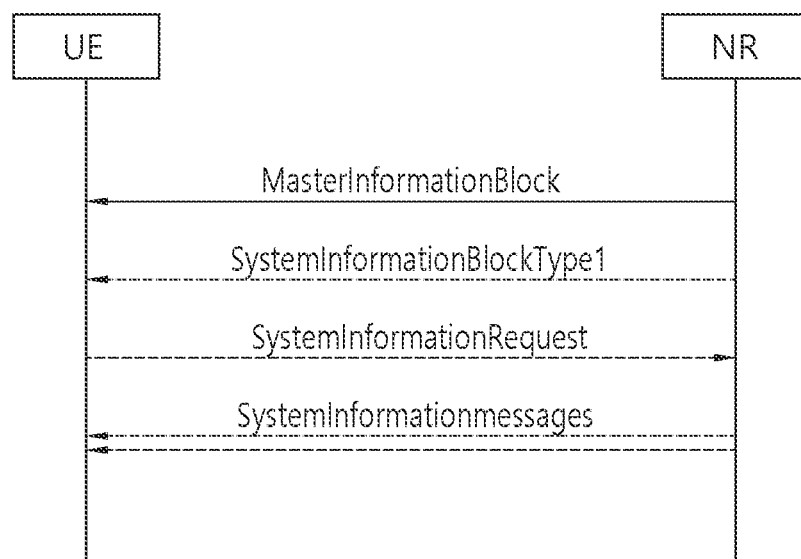
FIG. 15 illustrates an example of a system information acquisition process of a UE.

FIG. 15 illustrates an example of a system information acquisition process of a UE.

Referring to FIG. 15, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 6.

TABLE 6

| Type of signal | Operation/obtained information |
| --- | --- |
| Step 1 Uplink PRACH preamble | To obtain initial beam Random election of RA-preamble ID |
| Step 2 Random access response on DL-SCH | Timing alignment information RA-preamble ID Initial uplink grant, temporary C-RNTI |

TABLE 6-continued

| | Type of signal | Operation/obtained information |
|---|---|---|
| Step 3 | Uplink transmission on UL-SCH | RRC connection request UE identifier |
| Step 4 | Downlink contention resolution | C-RNTI on PDCCH for initial access C-RNTI on PDCCH for RRC_CONNECTED UE |

Figure 16:
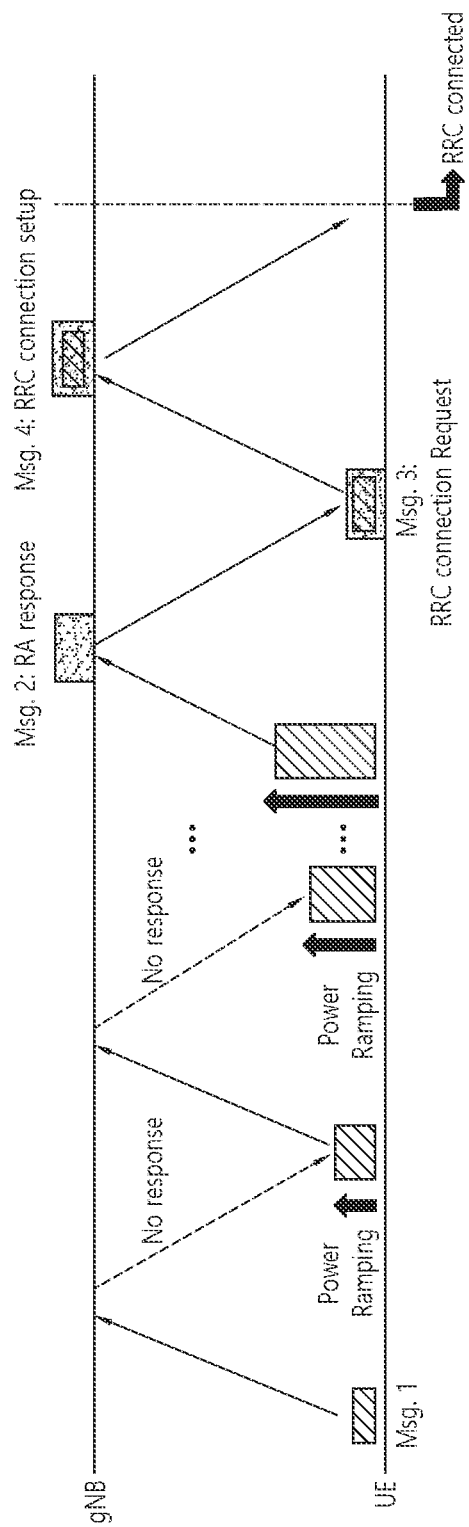
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
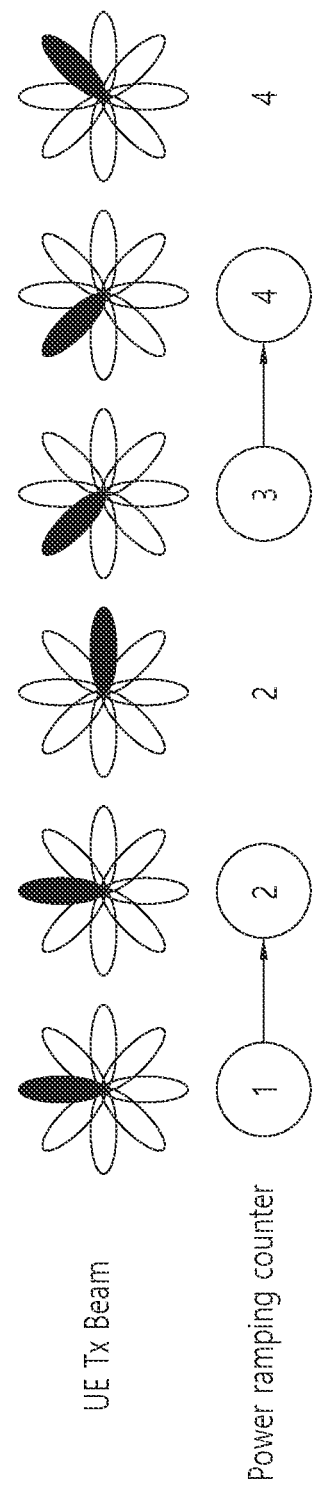
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
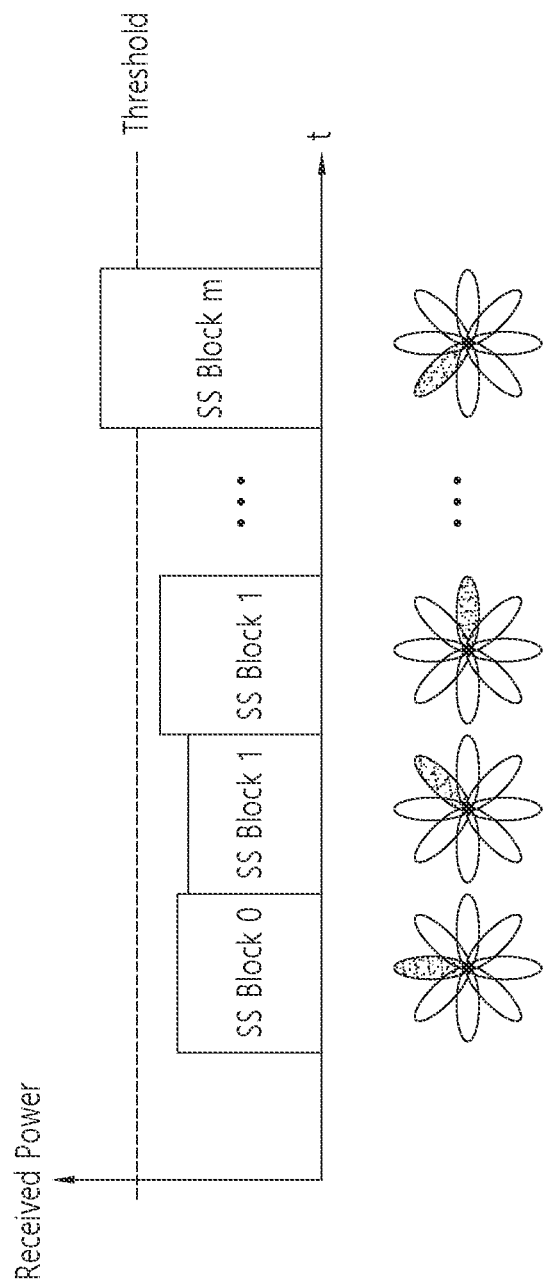
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

Hereinafter, the proposal of the present disclosure will be described in more detail.

The following drawings were created to explain specific examples of the present disclosure. Since the names of specific devices described in the drawings or the names of specific signals/messages/fields are presented by way of example, the technical features of the present disclosure are not limited to the specific names used in the following drawings.

In the NR system, a maximum of four BWPs may be set per serving cell, and a dormant state considers operation in units of BWPs. Accordingly, a dormancy behavior for each cell and BWP needs to be defined.

In the LTE system, a dormant state is defined in order to rapidly perform activation/deactivation of a secondary cell (SCell), and when a specific SCell is set to a dormant state, a UE may not monitor a PDCCH for the cell. Thereafter, in order to rapidly activate the corresponding SCell, it is defined that measurement and reporting are performed in the dormant state to monitor the channel condition and link status of the corresponding cell. For example, when a specific SCell is set to a dormant state, a UE does not perform PDCCH monitoring but may perform measurement and reporting for channel state information (CSI)/radio resource management (RRM). In the NR system, the aforementioned dormant state or a dormancy behavior may be defined in units of BWP.

For example, a dormancy behavior for each cell and BWP may be defined through the following methods. Meanwhile, in the present disclosure, a dormancy behavior may be cross-interpreted as a UE operation based on a dormant mode, and a normal behavior may be cross-interpreted as an operation other than the dormancy behavior or as a UE operation based on a normal mode.

(Method 1 of Defining Dormancy Behavior) State Change

A network may indicate transition to a dormant state for a specific BWP, and a UE may not perform some or all of PDCCH monitoring set to the BWP for which transition to the dormant state is indicated.

(Method 2 of Defining Dormancy Behavior) Dormant BWP

A network may designate a specific BWP as a dormant BWP. For example, it is possible to instruct PDCCH monitoring not to be performed by configuring a BWP having a bandwidth of 0, indicating minimum PDCCH monitoring through BWP configuration, not indicating a search space set configuration, or the like.

Additionally, the NR system considers switching between a normal state and a dormant state through L1 signaling such as DCI for faster SCell activation/deactivation. For example, a dormancy behavior of a specific cell may be activated/deactivated through the following methods.

(Activation Method 1) Introduction of Special DCI

Special DCI for indicating a dormancy behavior of each SCell may be defined. For example, a UE may be instructed to monitor special DCI in a PCell, and a network may determine whether dormancy is set for each SCell through the special DCI. The dormancy behavior of the SCell may be defined using the aforementioned method 1, method 2, or the like.

(Activation Method 2) Enhancement of BWP Indication Field in DCI

A BWP indication field of the existing DCI may be extended to perform BWP indication of the corresponding cell and/or specific SCell(s). That is, cross-carrier indication for a BWP may be performed through the existing BWP indication field.

(Activation Method 3) BWP Cross-Carrier Scheduling

Conventional cross-carrier scheduling indicates whether a cell is a scheduling cell or a scheduled cell, and in the case of a scheduled cell, performs pairing between carriers by indicating a scheduling cell of the scheduled cell. In order to define a dormancy behavior for an SCell, a method of indicating whether cross-carrier scheduling is performed for each BWP may also be considered. For example, in each BWP configuration of the SCell, a scheduling cell that can indicate state transition when a dormancy behavior is performed in the corresponding BWP may be designated. Alternatively, when a dormant BWP is designated, a scheduling cell that indicates a dormancy behavior in the corresponding BWP may be designated in the corresponding BWP configuration.

As described above, various methods for implementing fast activation/deactivation, and dormancy behavior of the SCell in NR are under discussion. When the above-mentioned methods are used, the following needs to be additionally considered.

(Issue 1) Default BWP triggered by a BWP inactivity timer
(Issue 2) Scheduling information in DCI triggering dormancy behavior
(Issue 3) HARQ feedback of DCI triggering dormancy behavior The considerations and solutions will be described below.

In the present disclosure, a D-BWP may mean a BWP in which a dormancy behavior is performed, and an N-BWP is a normal BWP and may mean a BWP in which the conventional BWP operation is performed. In addition, in the present disclosure, a dormancy behavior in a certain BWP may mean an operation in which a PDCCH is not received in the BWP or is received in a longer period than in a normal behavior, or an operation in which PDSCH/PUSCH scheduling for the BWP is not performed or is performed in a period longer than the normal behavior. Similarly, the dormant BWP may mean a BWP in which a PDCCH is not received or is received in a longer period than in the normal behavior, or PDSCH/PUSCH scheduling for the BWP is not performed or is performed in a longer period than in the normal BWP.

Figure 19:
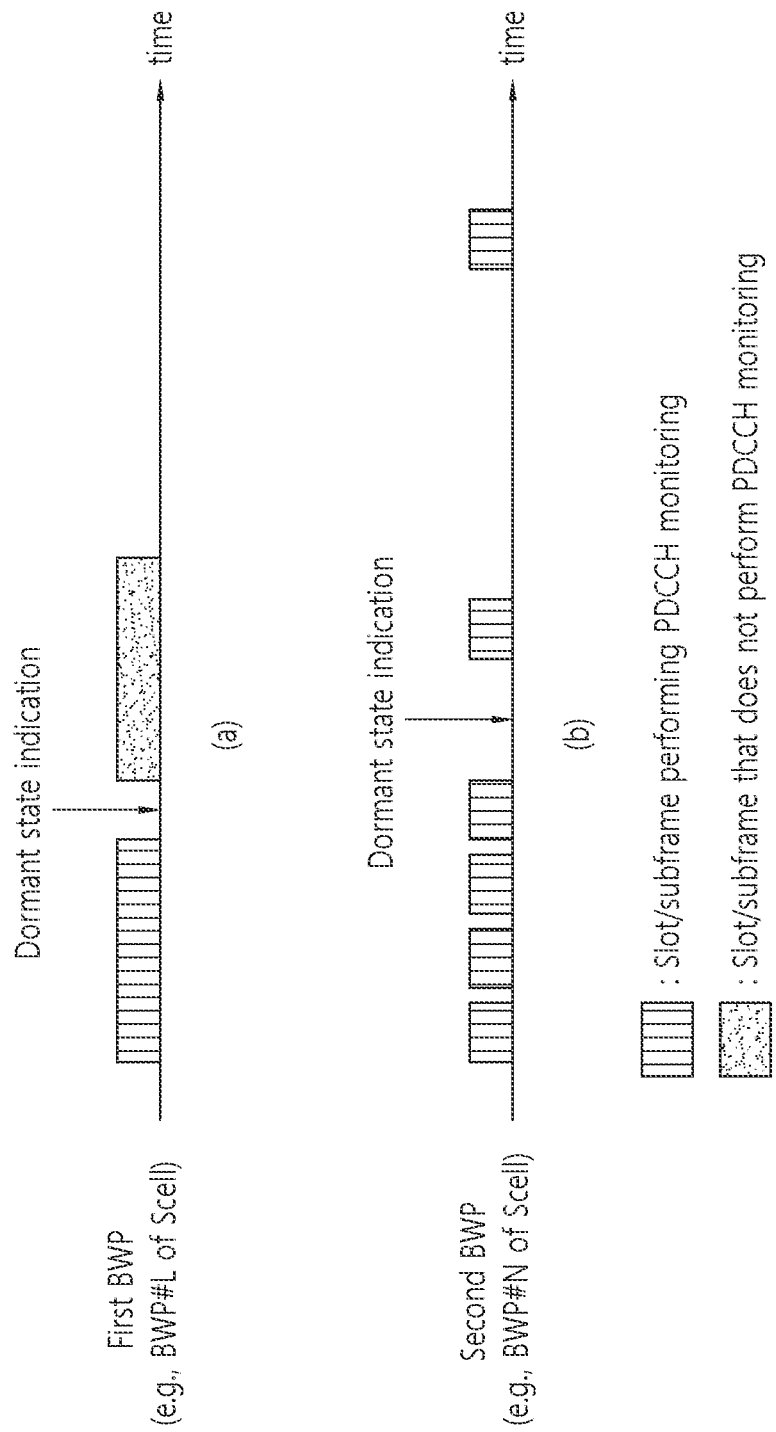
FIG. 19 shows an example of a dormancy behavior.

FIG. 19 shows an example of a dormancy behavior. Specifically, (a) and (b) of FIG. 19 show examples of an operation according to indication of a dormant state of a UE.

Referring to (a) of FIG. 19, the UE performs PDCCH monitoring in a first BWP based on a normal behavior. Thereafter, when the UE receives a dormant state indication, the UE does not perform PDCCH monitoring.

Referring to (b) of FIG. 19, the UE performs PDCCH monitoring in a second BWP based on the normal behavior. Here, PDCCH monitoring may be periodically performed based on a first period. Thereafter, when the UE receives dormant state indication, the UE periodically performs PDCCH monitoring based on a second period. In this case, the second period may be longer than the first period.

Hereinafter, a default BWP triggered by a BWP inactivity timer will be described.

In relation to the BWP operation, a BWP inactivity timer has been introduced in the NR system in order to prevent a case in which different active BWPs are configured due to misunderstanding between a UE and a network. If the UE does not receive a PDCCH for more than a specific time designated by a timer in an active BWP, the UE can move to a default BWP indicated in advance by the network and perform PDCCH monitoring in the default BWP according to PDCCH monitoring configuration such as CORESET and search space set configuration for the default BWP.

Figure 20:
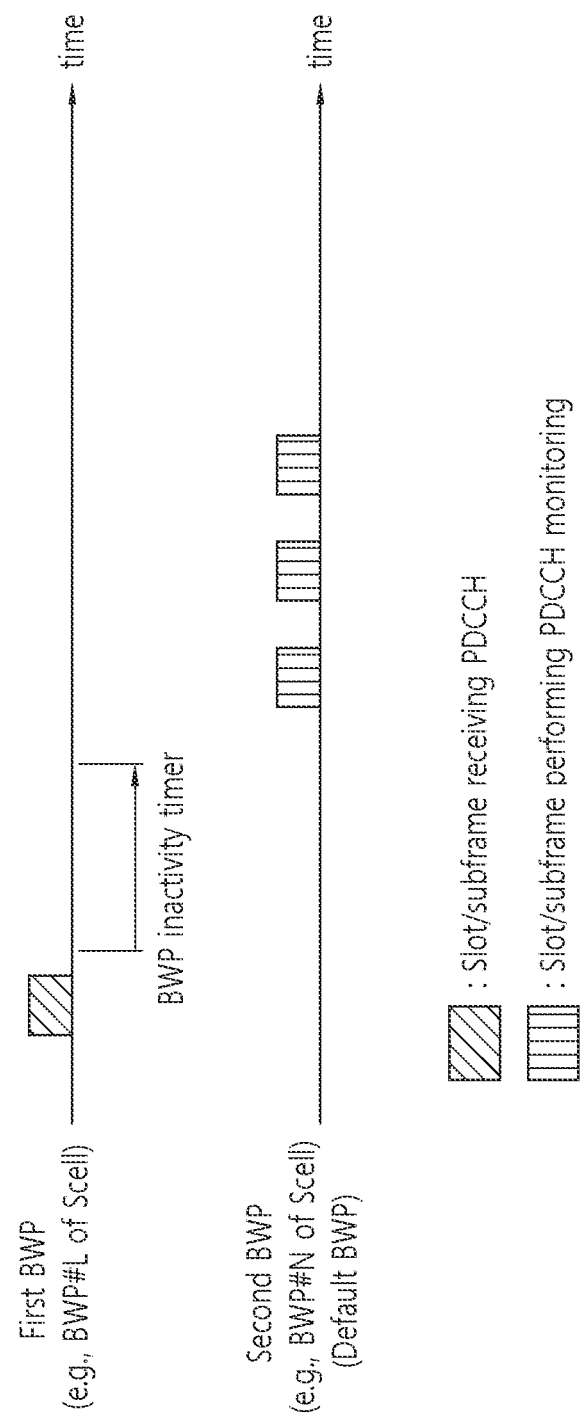
FIG. 20 shows an example of a BWP operation.

FIG. 20 shows an example of a BWP operation.

Referring to FIG. 20, when a UE does not receive a PDCCH for a time set by the BWP inactivity timer in a first BWP while receiving the PDCCH on the first BWP, the UE moves to a second BWP that is a default BWP and performs PDCCH monitoring.

Meanwhile, in the present disclosure including FIG. 20, moving from the first BWP to the second BWP may mean that an active BWP is changed from the first BWP to the second BWP.

When a default BWP operation and a dormancy behavior are performed together, operations inconsistent with the purposes thereof may be performed. For example, the network may instruct a specific SCell to move to a D-BWP or to switch the current BWP to a dormant state for power saving of a UE. However, the UE for which a BWP inactivity timer is configured may move to the default BWP after a certain period of time and perform PDCCH monitoring.

A simple way to solve this is to consider setting the default BWP to a D-BWP. However, in this case, an additional method for resolving misunderstanding between the network and the UE, which is the original purpose of the default BWP, is required. In the present disclosure, the following method is proposed in order to apply the dormancy operation and the BWP inactivity timer together.

When the network instructs a UE to move to a D-BWP or switches the current active BWP to a dormant state, the UE may ignore a previously set BWP inactivity timer or reset the BWP inactivity timer to a predefined value or a value indicated by the network in relation to the dormant state. For example, the network may set an appropriate dormancy period in consideration of the traffic condition of the UE and indicate the corresponding value to the UE in advance. Thereafter, when the UE is instructed to move to a D-BWP or to switch the current active BWP to a dormant state, the UE may set a value indicated by the network as a BWP inactivity timer value. In addition, an inactivity timer for the dormancy behavior indicated by the network may operate independently of the existing BWP inactivity timer. For example, a UE instructed to perform a dormancy behavior may turn off the existing BWP inactivity timer and operate the inactivity timer for the dormancy behavior. Thereafter, when the BWP inactivity timer expires or the UE is instructed to move to an N-BWP or to switch to a normal state, the UE may end the dormancy behavior.

In addition, when the dormancy behavior ends by the inactivity timer for the dormancy behavior, the UE may move to a default BWP of the corresponding cell or switch to a normal state. Alternatively, when the network ends the dormancy behavior by the inactivity timer, the network may designate a BWP to which the UE will move and indicate the BWP to the UE.

Figure 21:
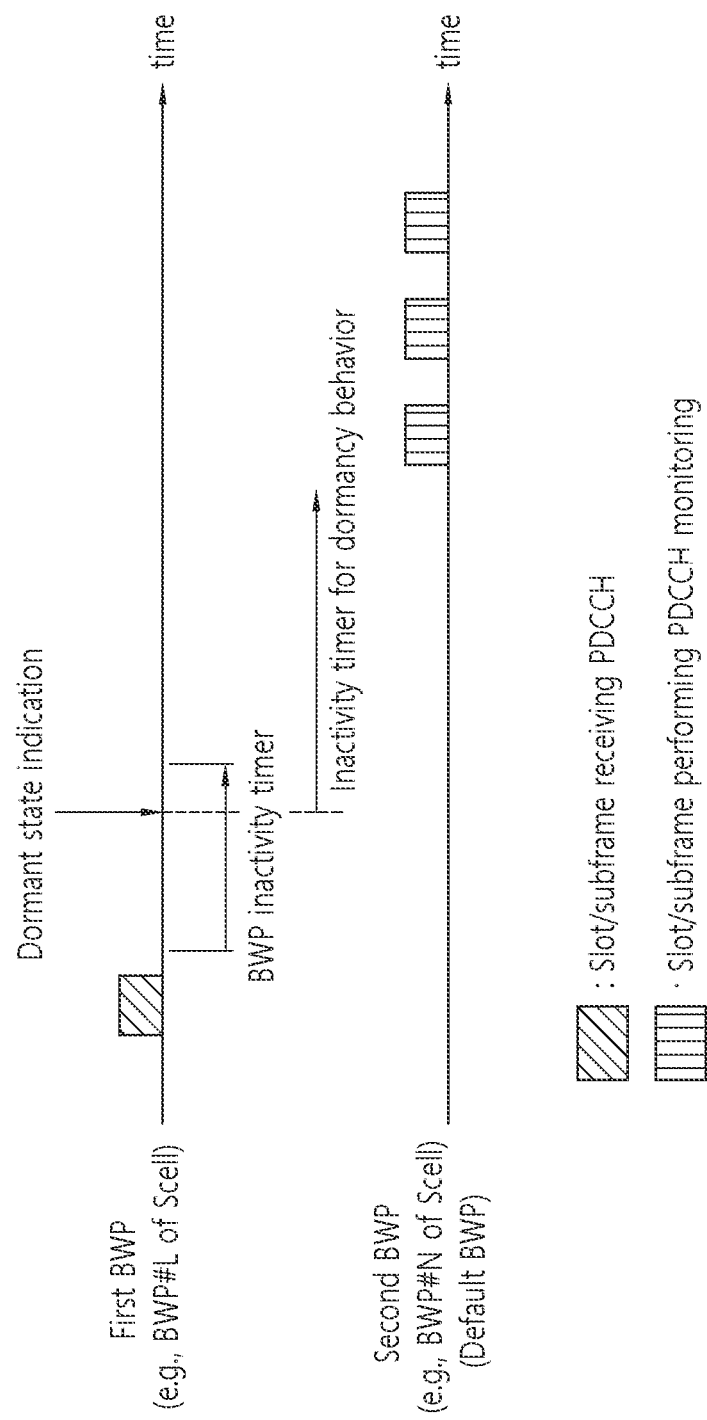
FIG. 21 shows another example of the BWP operation of a UE.

FIG. 21 shows another example of the BWP operation of a UE. Specifically, FIG. 21 shows an example of a case in which the UE is instructed/configured to switch to a dormant state while the BWP inactivity timer is in operation in the example of FIG. 20.

Referring to FIG. 21, the UE receives a dormant state transition message during the operation of the BWP inactivity timer on a first BWP. The dormant state transition message may be a message for instructing the UE to switch to a dormant state.

The inactivity timer for the dormancy operation may start upon reception of the dormant state transition message by the UE. Here, if the inactivity timer for the dormancy behavior expires, the UE may perform PDCCH monitoring on a second BWP, which is a default BWP.

Hereinafter, scheduling information in DCI which triggers a dormancy behavior will be described.

When movement between a D-BWP and an N-BWP is indicated by DCI or the like, and the DCI is normal scheduling DCI, a problem may occur if it is not clear whether an operation for scheduling information in the DCI is performed. For example, when an operation for PDSCH scheduling in DCI indicating movement to a D-BWP is performed, an additional operation may be required depending on whether reception of the corresponding PDSCH is successful. This may mean that PDCCH/PDSCH transmission/reception operations may continue even in the D-BWP. In order to solve such a problem, the present disclosure proposes the following method.

(Case 1-1) Case in which DCI Indicating a Dormancy Behavior for a Specific Cell or DCI Indicating Switching to a Dormant BWP Includes PDSCH Scheduling Information As described above, since PDSCH transmission/reception in a D-BWP may cause additional PDCCH/PDSCH transmission/reception, an operation contrary to the purpose of the dormant BWP may be performed. Accordingly, PDSCH scheduling information for a D-BWP included in DCI indicating a dormancy behavior may be ignored. In addition, the decoding performance of a UE may be improved by transmitting a known bit or a known bit sequence in the corresponding field. To this end, known bit information on a field related to PDSCH scheduling may be indicated by a network or through previous definition.

(Case 1-2) Case in which in DCI Indicating Transition from a Dormancy Behavior to a Normal Behavior or DCI Indicating Transition from a Dormant BWP to a Normal BWP Includes PDSCH Scheduling or Uplink Scheduling Information In case 1-2, since PDSCH scheduling information or uplink scheduling information can reduce PDCCH transmission in a N-BWP or in a normal state, it may be desirable to apply the information. However, in case 1-2, determination of whether to apply PDSCH scheduling information or uplink scheduling information may be limited to a case in which the PDSCH scheduling information or uplink scheduling information is UL/DL scheduling related information in a N-BWP in which transition occurs or PDSCH or uplink transmission related information in a normal state. For example, when a field indicating a dormancy behavior for specific SCell(s) is added to DCI for scheduling a PDSCH of a PCell, PDSCH scheduling information of the DCI may mean PDSCH related information in the PCell.

Hereinafter, HARQ feedback of DCI that triggers a dormancy behavior will be described.

Since the dormancy behavior can limit PDCCH/PDSCH transmission and reception operations in an indicated cell (according to definition) as much as possible, subsequent operations of a network and a UE may be greatly affected by missing/false alarm, and the like. In order to solve this, a method for improving decoding performance may be applied or an additional confirmation operation for dormancy behavior indication may be required. To solve this problem, the present disclosure proposes ACK/NACK feedback for movement to a D-BWP or transition to a dormant state. To this end, the following methods may be considered. The methods which will be described below may be implemented alone or in combination. In the following description, when DCI is configured only with an indication for a dormancy behavior, a UE cannot determine whether or not NACK is provided, and thus the proposal below may be interpreted as transmitting ACK signaling. Alternatively, when DCI indicating a dormancy behavior also includes PDSCH scheduling, it may mean that ACK/NACK for the corresponding PDSCH or uplink transmission in the case of uplink scheduling is performed upon reception of a command for the dormancy behavior. That is, since both ACK and NACK may indicate that DCI has been normally received, both ACK and NACK may indicate that an indication for the dormancy behavior has been received.

(Case 2-1) Combination of Dormancy Command and UL/DL Scheduling

DCI indicating a dormancy behavior may include uplink/downlink scheduling information, and ACK/NACK for downlink and scheduled uplink transmission may mean that DCI including a dormancy behavior has been properly received, and thus a UE and a network may assume that the indicated dormancy behavior is to be performed. Here, since NACK means NACK for PDSCH reception, NACK may also mean that an indication for a dormancy behavior has been received.

(Case 2-1-1) Case in which a Target of Uplink/Downlink Scheduling is a Dormant BWP or a Dormant State It may be assumed that a UE can perform a dormancy behavior after termination of up to scheduled uplink/downlink scheduling and ACK/NACK resources or uplink resources for the corresponding scheduling in a D-BWP or a dormant state conform to the conventional ACK/NACK resource determination method and uplink transmission method. The UE that has completed corresponding uplink/downlink transmission/reception may perform a dormancy behavior and may assume that subsequent scheduling is not present or ignore subsequent scheduling.

(Case 2-1-2) Case in which a Target of Uplink/Downlink Scheduling is a Scheduling Cell/BWP or a Normal State In this case, ACK/NACK or uplink transmission may mean that a dormancy command has been normally received in the scheduling cell/BWP or normal state, and a UE may perform a dormancy behavior.

(Case 2-2) Combination of Dormancy Command and Non-Scheduling/Fake-Scheduling

Case 2-2 is a case in which a dormancy behavior is indicated by DCI in which only a command for a dormancy behavior is valid without uplink/downlink scheduling information or DCI in which a scheduling information field can be assumed as dummy/dummy data. In this case, feedback information for the DCI may be transmitted because there is no associated uplink/downlink transmission/reception. Here, when DCI is not received, the UE does not ascertain whether the DCI is transmitted, and thus it may actually mean ACK transmission. In this case, feedback for the dormancy command may be transmitted in a dormant BWP or a dormant state, and feedback resources may be indicated by the DCI carrying the dormancy command or feedback may be performed through predefined feedback resources.

Hereinafter, BWP determination for a normal state will be described.

When transition between a normal BWP and a dormant BWP is performed only by changing states without BWP indication, for example, when a network allocates 1 bit to DCI transmitted from a PCell per SCell or per SCell group to indicate only dormancy, a BWP for dormant mode/normal mode is predefined. As an example, the network may designate one BWP (D-BWP) for the dormant mode, and if a predefined 1-bit field in DCI is "1" or "0", designate an active BWP of an associated SCell as a D-BWP. In the case of a dormant BWP, since a plurality of dormant BWPs only increase signaling overhead and have no additional gain, it may be desirable to designate only one dormant BWP per cell. On the other hand, in the case of a general BWP, a maximum of 4 BWPs per cell may be designated as in the conventional scheme. This may mean that, when transition from the dormant mode to the normal mode occurs, movement to one of configured normal BWPs is required. The present disclosure proposes a method of selecting an active BWP in the normal mode when a UE is instructed to switch from the dormant mode to the normal mode.

(Option 1-1) Active BWP in Normal Mode Immediately Before Dormant Mode

As a first method, an active BWP in the normal mode before entering the dormant mode may be assumed to be an active BWP in the normal mode after the dormant mode. This may be useful when a time during which the dormant mode is maintained is relatively short.

(Option 1-2) Default BWP or BWP Predefined by Network

When a UE switches from the dormant mode to the normal mode, the UE may move to a default BWP designated in the corresponding cell. In this case, the default BWP may be a default BWP to which the UE will move when a BWP inactivity timer expires, or a BWP designated by the network using higher layer signaling, or the like for an SCell dormancy behavior. When the network wants to operate a UE in a wider BWP or a narrower BWP than the default BWP, the network can move the BWP in the normal mode through the conventional BWP switching procedure.

A method to be actually applied between the aforementioned options 1-1 and 1-2 may be designated by previous definition or may be configured by the network through higher layer signaling or the like. Alternatively, an option to be applied may be determined by additionally designating a timer or the like. For example, at the time of changing from the dormant mode to the normal mode, if a predefined timer has not expired, a UE may move to the last active BWP in the normal mode immediately before the dormant mode according to option 1-1. After the timer expires, the UE instructed to switch to the normal mode may move to a default BWP and perform the normal mode.

Hereinafter, the maximum number of BWPs per cell will be described.

In the conventional BWP operation, a maximum of 4 BWPs per cell can be configured for a UE. On the other hand, when the dormant BWP is introduced, the limit may need to be adjusted. The present disclosure proposes a method for designating the maximum number of BWPs in a cell in which a dormant BWP is designated.

(Option 2-1) the Maximum Number of BWPs is Increased by 1 if Dormant BWPs are Designated.

With respect to dormant BWPs, increase in the maximum number of BWPs per cell due to dormant BWPs may not be a major issue because a UE has little hardware/software impact. Therefore, in a cell in which dormant BWPs are designated, the same operation as the previous operation can be maintained by increasing the maximum number of BWPs by 1.

(Option 2-2) Dormant BWPs are not Included in the Number of BWPs.

As described above, on a dormant BWP, a UE does not perform most of operations performed in the conventional BWP. Accordingly, dormant BWPs are not included in the number of BWPs.

Hereinafter, HARQ feedback for dormancy indication will be described.

As described above, the dormancy behavior may limit PDCCH/PDSCH transmission and reception operations in an indicated cell (according to the definition) to the maximum, and thus subsequent operations of a network and a UE may be significantly affected by missing/false alarm and the like. To solve this, a method for increasing decoding performance may be applied or an additional confirmation operation for dormancy behavior indication may be required. Hereinafter, in order to solve such a problem, an ACK/NACK feedback method for dormancy indication is proposed. Although an ACK/NACK feedback method for a dormancy behavior of an SCell in a PCell will be described below, this method may be equally applied even when the SCell indicates a dormancy behavior for another SCell.

As a method of indicating a dormancy behavior of an SCell in a PCell, a method of appending dormancy behavior indication field for the SCell to DCI that schedules a PDSCH of the PCell or indicating a dormancy behavior for the SCell by reinterpreting some fields in the DCI that schedules the PDSCH of the PCell may be considered. In this case, the following two cases can be considered according to the role of DCI. Hereinafter, an ACK/NACK feedback method for dormancy indication for each case will be described.

(Case 3-1) Combination of PDSCH Scheduling Information and SCell Dormancy Indication In case 3-1, ACK/NACK for a PDSCH scheduled along with dormancy indication may also be interpreted as ACK/NACK for dormancy indication. However, since NACK may be transmitted even when DCI is missed for the PDSCH, for example, a plurality of PDSCHs may be scheduled and HARQ-ACK feedbacks for the PDSCHs may be transmitted in one PUCCH resource, there may be a problem that it is not possible to distinguish whether the corresponding NACK is NACK due to DCI missing or NACK indicating that DCI is received, that is, dormancy indication is received, but decoding of PDSCHs has failed. To solve this problem, a method of transmitting ACK/NACK information corresponding to a PDSCH and ACK/NACK information for dormancy indication are transmitted through the same PUCCH resource is proposed. Specifically, ACK/NACK information corresponding to a PDSCH and ACK/NACK information for dormancy indication may be fed back/transmitted together through a slot after K1 slots indicated by HARQ-ACK feedback timing through the DCI from the DCI or the corresponding PDSCH. More specifically, the ACK/NACK information corresponding to the PDSCH may configure a semi-static or dynamic HARQ-ACK codebook in the same way as in the legacy NR system, and then append 1-bit HARQ-ACK corresponding to dormancy indication to a specific position in the corresponding HARQ-ACK codebook, such as the last digit or the highest bit index corresponding thereto, for example. That is, case 3-1 may mean a method of appending an ACK/NACK field (e.g., a 1-bit field) for dormancy indication to the existing ACK/NACK reporting procedure for PDSCH scheduling indicated along with the dormancy indication. Alternatively, 1-bit HARQ-ACK corresponding to dormancy indication may be transmitted in the next digit in the codebook of the HARQ-ACK bit corresponding to the PDSCH, or the 1-bit HARQ-ACK corresponding to the dormancy indication may be transmitted in a specific position of a HARQ-ACK payload corresponding to a cell to which the PDSCH is transmitted in the codebook, for example, the last digit or the highest bit index corresponding thereto.

Alternatively, the UE may not expect PDSCH scheduling for a corresponding SCell in a slot in which the SCell switches a dormant state or a plurality of slots including the corresponding slot. In this case, HARQ-ACK for dormancy indication for the SCell may be transmitted at a position where HARQ-ACK information for the SCell of the corresponding timing is transmitted in the HARQ-ACK codebook for dormancy indication transmitted to a corresponding PCell for semi-static codebook, and the like. Here, if the dormancy indication is an indication for an SCell group consisting of a plurality of SCells, the same feedback may be transmitted at all HARQ-ACK positions for the corresponding SCells, or feedback may be transmitted at a HARQ-ACK position for a specific SCell such as an SCell having the lowest index. In addition, the feedback may be transmitted as the same value for a plurality of slot timings at which PDSCH scheduling is not expected to the SCell.

Meanwhile, a semi-static codebook and a dynamic codebook in the present disclosure may mean a type-1 codebook and a type-2 codebook based on NR.

(Case 3-2) SCell Dormancy Indication without PDSCH Scheduling Information

According to case 3-2, since there is no PDSCH scheduling indicated along with dormancy indication, ACK/NACK for a PDCCH, that is, dormancy indication needs to be transmitted. For this, the following methods may be considered.

(ACK/NACK transmission method 1) After a HARQ-ACK codebook based on NR is configured, such as a case in which a semi-static HARQ-ACK codebook is configured, a HARQ-ACK field for dormancy indication may be appended to a specific position. Here, the specific position may be the last digit or the highest bit index corresponding thereto, and the appended HARQ-ACK field may be a 1-bit field, for example.

(ACK/NACK transmission method 2) When the semi-static HARQ-ACK codebook is configured, similarly to the HARQ-ACK feedback method for DCI indicating SPS release of NR, a UE may assume that there is no other unicast PDSCH reception within the same slot as the slot in which a PDCCH indicating a dormant state is transmitted when HARQ-ACK is transmitted in corresponding DCI within the semi-static HARQ-ACK codebook or at a position corresponding to a slot in which the DCI is transmitted.

(ACK/NACK transmission method 3) In the same manner as in case 3-1, HARQ-ACK for dormancy indication may be transmitted at a HARQ-ACK position corresponding to the SCell within the HARQ-ACK codebook.

Hereinafter, HARQ-ACK feedback timing will be described.

In the above description, the HARQ-ACK feedback timing for dormancy indication may be determined as follows.
(Option 3-1) Slots after K1 Slots from DCI A slot after K1 from a slot in which DCI including dormancy indication has been transmitted, i.e., after a slot offset between DCI and HARQ-ACK may be determined.
(Option 3-2) K1 Slots from PDSCH Scheduled by DCI A network may determine a slot after K1 slots from a PDSCH position based on PDSCH resource allocation information in DCI including dormancy indication as a feedback timing. In case 3-2, although there is no PDSCH that is actually scheduled, the network may allocate a virtual PDSCH to deliver the HARQ-ACK feedback timing for dormancy indication.

The above-mentioned proposal may be applied only when a candidate PDSCH reception slot associated with an uplink channel carrying HARQ-ACK information or a PDCCH monitoring occasion corresponding thereto includes a monitoring occasion for a PDCCH indicating a dormant state. In addition, case 3-1 may be applied to only cases other than fallback PUCCH transmission, that is, a case in which HARQ-ACK information to be actually fed back is 1 bit corresponding only to a single PCell single PDSCH (in the case of a semi-static codebook) or corresponds to a single PDSCH with counter-DAI=1. In other words, in the case of fallback PUCCH transmission, only HARQ-ACK for a scheduled PDSCH may be fed back without additional HARQ-ACK feedback for dormancy indication.

The UE that has derived a slot offset through the above-described method needs to determine a start and length indicator value (SLIV) in a PDSCH slot corresponding to K1, to which HARQ-ACK will be mapped. To this end, the present disclosure proposes a method of mapping corresponding HARQ-ACK to a virtual SLIV indicated by DCI or a specific SLIV candidate such as the first or last candidate, for example. This method may be applied when the HARQ-ACK codebook is configured in the ACK/NACK transmission method 2, particularly in case 3-2.

Additionally, in the case of a semi-static codebook, a HARQ-ACK set corresponding to the current active downlink BWP of an activated cell and the first active downlink BWP of a deactivated cell is fed back. When the active downlink BWP of a specific cell is a dormant BWP, a HARQ-ACK codebook corresponding to the cell may be configured through the following method. In addition, the following methods may be applied from X ms after a dormant BWP is indicated, and the value X may be determined by previous definition or higher layer signaling of a network.
(Option 4-1) HARQ-ACK Corresponding to the First Active Downlink BWP and an SLIV and a Set of K1 Values Configured Therein as in a Deactivated Cell
(Option 4-2) 0 Bits
(Option 4-3) HARQ-ACK Corresponding to the Latest BWP Immediately Before the Corresponding Dormant BWP and an SLIV and a Set of K1 Values Configured Therein In addition to the above-described method, HARQ-ACK codebook configuration may conform to dormant BWP configuration when switching of a dormancy behavior is performed through switching between a BWP (dormant BWP) corresponding to a dormancy behavior and a BWP (non-dormant BWP) corresponding to a non-dormancy behavior. Alternatively, if there are no configurations for HARQ-ACK codebook configuration, such as a time domain resource assignment (TDRA) table and an SLIV table in dormant BWPs, it is possible to conform to the configuration of a specific BWP of the corresponding cell. Here, the specific BWP may be a BWP having the lowest/highest index BWP excluding dormant BWPs, a configured reference BWP, an initial BWP, the latest non-dormant active BWP, and the like, for example.

In the above-described methods, when a UE receives dormancy indication again before a dormancy/non-dormancy behavior according to dormancy indication is applied to the same SCell, the UE may follow the most recently received dormancy indication, or consider that an error has been generated in reception of corresponding DCI if two dormancy indications indicate different behaviors on the assumption that the two dormancy indications indicate the same behavior (dormancy or non-dormancy).

Alternatively, when the UE receives dormancy indication for an SCell, the UE may assume that dormancy indication for the corresponding cell is not transmitted before the corresponding dormancy/non-dormancy behavior is applied or before a specific time period, or may not receive dormancy indication.

Although a case where dormancy indication is transmitted along with downlink scheduling information has been mainly described above, dormancy indication can also be transmitted in uplink scheduling DCI. In the following, a feedback method for confirming whether a UE has correctly received dormancy indication when the dormancy indication is transmitted in uplink scheduling DCI is proposed. Here, feedback for dormancy indication may be transmitted only when the UE detects indication different from the previous indication, for example, when the UE has previously received dormancy indication but subsequently detects normal behavior indication, the UE has previously received normal behavior indication but subsequently detects dormancy indication, and a normal behavior instruction has been previously received but thereafter dormant When an indication is detected, and the UE has received indication for a specific SCell but subsequently receives indication for an SCell group.

(Feedback Method 1) Method of Using PUSCH

In the NR system, DCI format 0_1 (uplink non-fallback DCI) may include a PUSCH resource allocation field, a UL-SCH indicator field, and a CSI request field. In this case, CSI reporting and related operations of a UE may be as follows. Hereinafter, a HARQ-ACK feedback method for dormancy indication for each operation of each UE is proposed.

(Feedback method 1-1) When a UL-SCH indicator is OFF and a CSI request is ON, a UE performs aperiodic CSI report through a PUSCH.

In this case, when the UE performs CSI report, a gNB can recognize that the UE has received DCI, that is, DCI including dormancy indication, and thus additional dormancy indication related feedback may not be required.

(Feedback method 1-2) When the UL-SCH indicator and the CSI request are OFF, the UE does not perform PUSCH transmission for CSI report and only performs downlink measurement.

In this case, the UE may transmit a PUSCH to notify whether the dormancy indication is received. Here, the PUSCH may be a PUSCH with null contents.

Since the above-described method may not be distinguished from the conventional operation of performing only downlink measurement, the network may indicate transmission of DCI based on dormancy indication instead of downlink measurement using a specific field in the DCI or a combination with specific field(s), and the UE may transmit a PUSCH or a PUSCH with null contents according to PUSCH scheduling of the DCI. Here, the specific field may be an additional 1-bit field indicating that the corresponding DCI is DCI dedicated for dormancy indication or may be an existing field set to a specific value, for example, a resource allocation field set to 1.

Alternatively, in order to distinguish from the conventional operation of performing only downlink measurement, the UE may transmit a PUSCH or a PUSCH with null contents according to PUSCH scheduling of the corresponding DCI when the gNB indicates a dormancy behavior or a normal behavior for an arbitrary SCell. In this case, downlink measurement may not be performed.

That is, when uplink grant DCI indicates that dormancy indication is ON and both the UL-SCH indicator and CSI report trigger are OFF according to the above-described method, a signal may be transmitted through PUSCH resources allocated by the DCI. On the other hand, when dormancy indication is OFF and both the UL-SCH indicator and CSI report trigger are OFF, PUSCH transmission corresponding to the DCI may be configured not to be performed.

(Feedback Method 2) Method of Using HARQ-ACK Feedback Mechanism

When the UL-SCH indicator is OFF and the CSI request is OFF, the UE may transmit explicit feedback for dormancy indication.

Since this method may not be distinguished from the conventional operation of performing only downlink measurement, the network may indicate DCI transmission for dormancy indication rather than downlink measurement using a combination with specific field(s) in DCI, and the UE may transmit feedback for the dormancy indication using explicit feedback.

Here, the explicit feedback may be performed in such a manner that, when HARQ-ACK for other PDSCHs is fed back in the corresponding slot, feedback for the dormancy indication is performed by adding 1 bit. Here, if there is no HARQ-ACK feedback for other PDSCHs, feedback for the dormancy indication may be performed using a PUCCH, and PUCCH resources therefor may be preset by RRC signaling, set through an uplink grant, or set through a combination of signaling and the uplink grant. That is, when dormancy indication is transmitted through uplink grant DCI, a feedback transmission timing and PUCCH transmission resources to be used or applied for transmission of feedback for the corresponding dormancy indication may be indicated through fields in the DCI or reinterpretation of the fields in the DCI.

Figure 22:
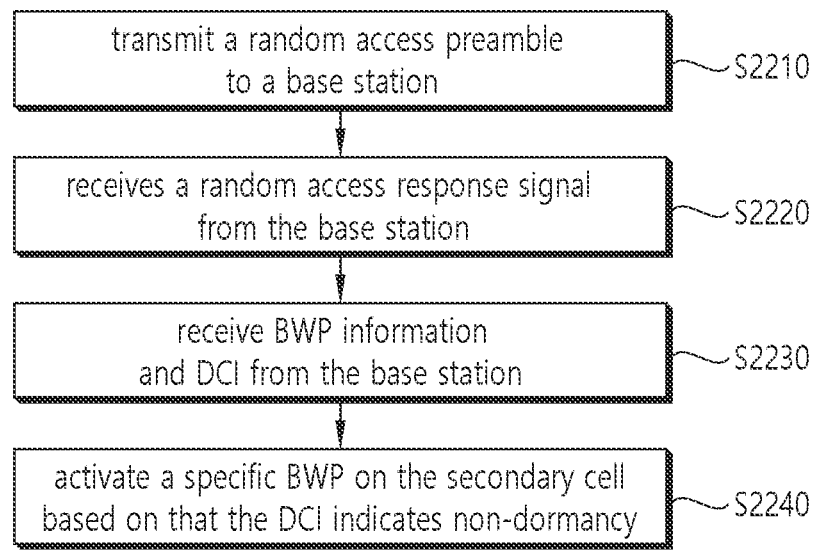
FIG. 22 is a flowchart of an example of a BWP activation method of a UE.

FIG. 22 is a flowchart of an example of a BWP activation method of a UE.

Referring to FIG. 22, the UE transmits a random access preamble to a base station (S2210). The UE receives a random access response signal from the base station (S2220).

In addition, the UE receives BWP information and downlink control information (DCI) from the base station (S2230).

In addition, based on that the DCI indicates "non-dormant", the UE activates a specific BWP on the secondary cell (S2240).

Here, the BWP information may inform the specific BWP. Also, here, the BWP information may be transmitted through a higher layer signaling.

The claims described in the present disclosure may be combined in various manners. For example, the technical features of the method claims of the present disclosure may be combined and implemented as an apparatus, and the technical features of the apparatus claims of the present disclosure may be combined and implemented as a method. In addition, the technical features of the method claims of the present disclosure and the technical features of the apparatus claims may be combined and implemented as an apparatus, and the technical features of the method claims of the present disclosure and the technical features of the apparatus claims may be combined and implemented as a method.

In addition to a UE, the methods proposed in the present disclosure may be performed by an apparatus configured to control the UE, which includes at least one computer-readable recording medium including an instruction based on being executed by at least one processor, one or more processors, and one or more memories operably coupled by the one or more processors and storing instructions, wherein the one or more processors execute the instructions to perform the methods proposed in the present disclosure. Further, it is obvious that an operation of a base station corresponding to an operation performed by the UE may be considered according to the methods proposed in the present disclosure.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 23:
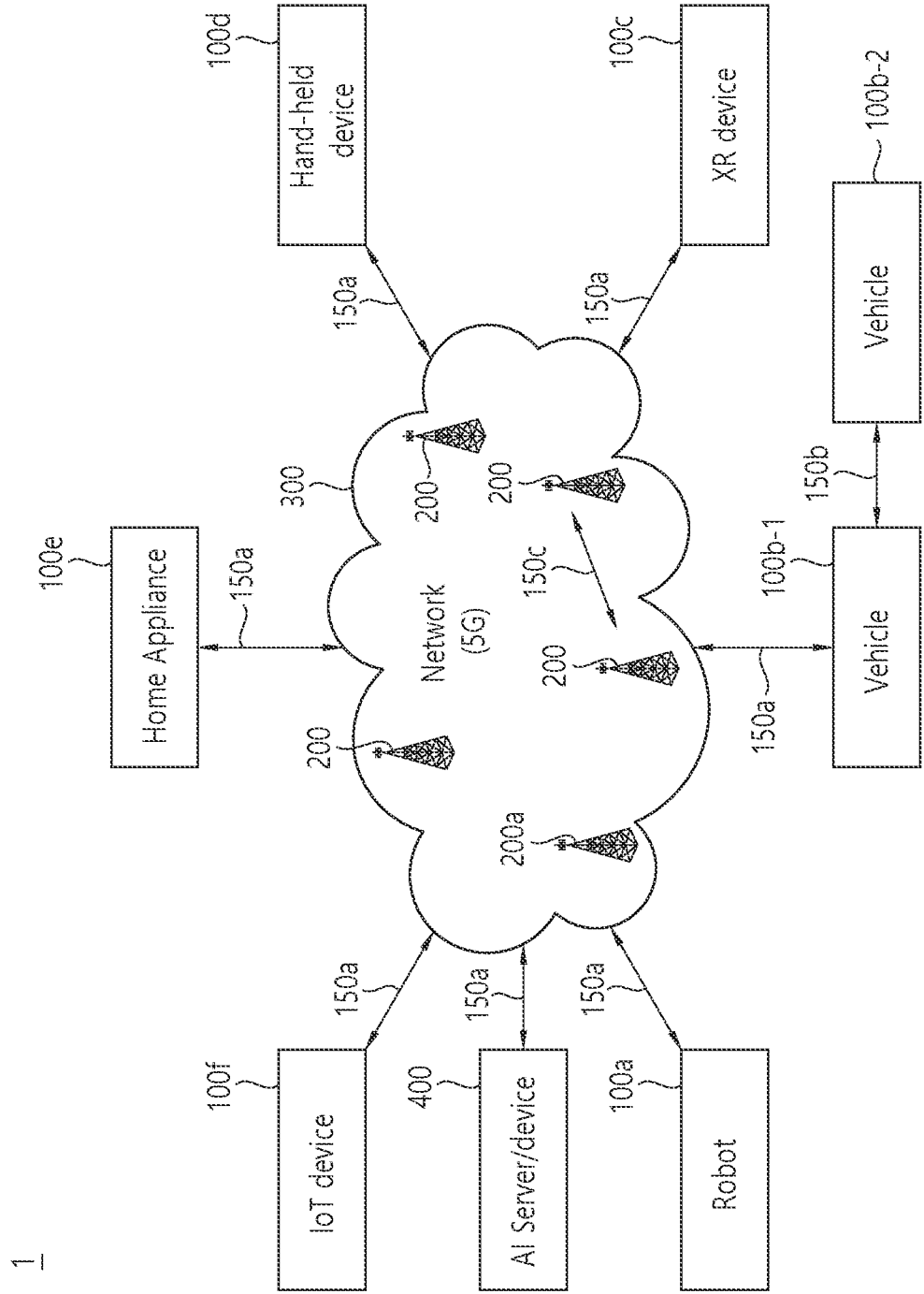
FIG. 23 illustrates a communication system 1 applied to the disclosure.

FIG. 23 illustrates a communication system 1 applied to the disclosure.

Referring to FIG. 23, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

Here, the wireless communication technology implemented in the wireless device of the present disclosure may include a narrowband Internet of Things for low-power communication as well as LTE, NR, and 6G. At this time, for example, NB-IoT technology may be an example of low power wide area network (LPWAN) technology, and may be implemented in standards such as LTE Cat NB1 and/or LTE Cat NB2, may be implemented in the standard of LTE Cat NB1 and/or LTE Cat NB2, and is not limited to the names mentioned above. Additionally or alternatively, the wireless communication technology implemented in the wireless device of the present disclosure may perform communication based on LTE-M technology. In this case, as an example, the LTE-M technology may be an example of an LPWAN technology, and may be called by various names such as enhanced machine type communication (eMTC). For example, LTE-M technology may be implemented by at least any one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the names described above. Additionally or alternatively, the wireless communication technology implemented in the wireless device of the present disclosure may include at least one of ZigBee, Bluetooth, and LPWAN considering low power communication and is not limited to the names described above. For example, the ZigBee technology may create personal area networks (PAN) related to small/low-power digital communication based on various standards such as IEEE 802.15.4, and may be called by various names.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 24:
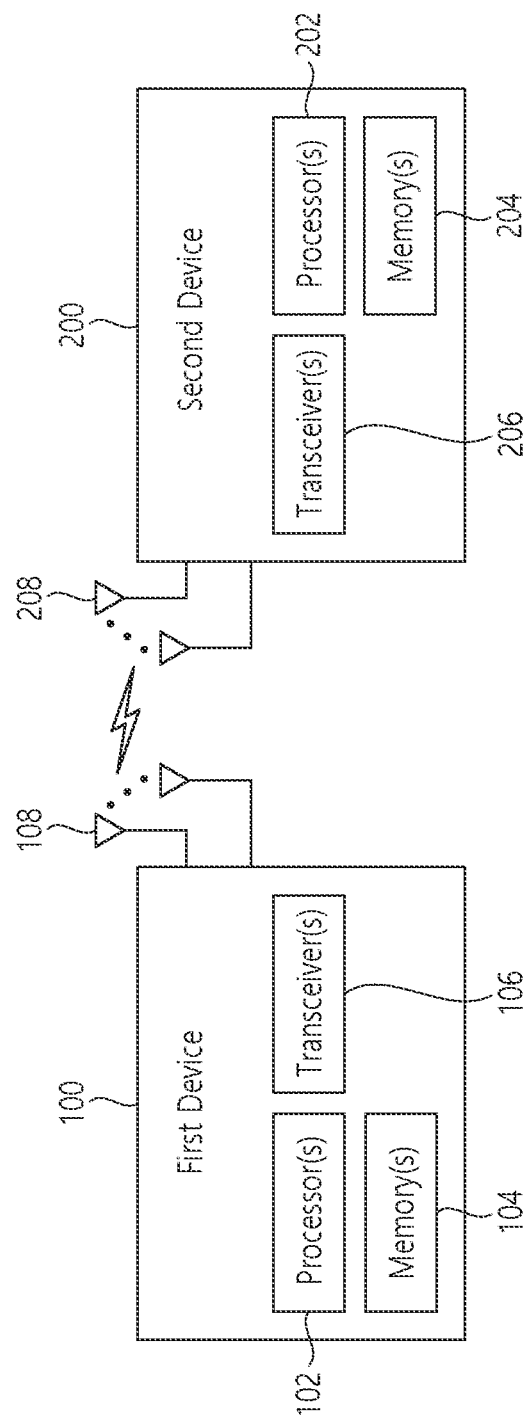
FIG. 24 illustrates a wireless device that is applicable to the disclosure.

FIG. 24 illustrates a wireless device that is applicable to the disclosure.

Referring to FIG. 24, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 23 and/or may respectively correspond to a wireless device 100x and a wireless device 100x of FIG. 23. The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 25:
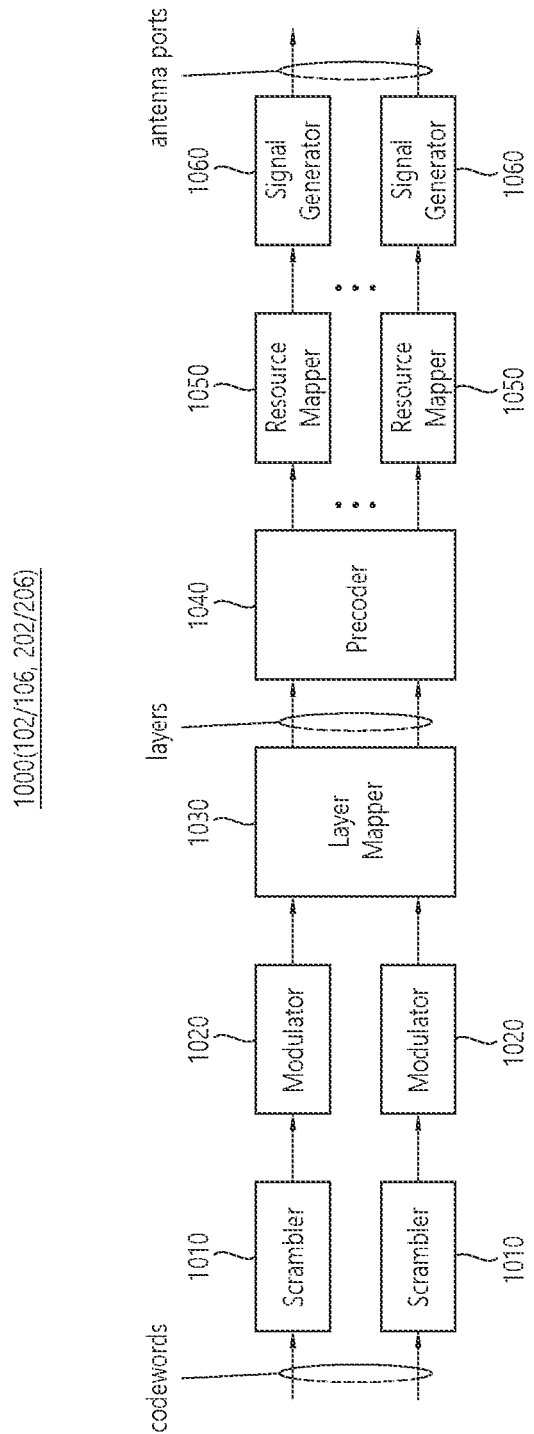
FIG. 25 illustrates a signal processing circuit for a transmission signal.

FIG. 25 illustrates a signal processing circuit for a transmission signal.

Referring to FIG. 25, the signal processing circuit 1000 may include a scrambler 1010, a modulator 1020, a layer mapper 1030, a precoder 1040, a resource mapper 1050, and a signal generator 1060. Operations/functions illustrated with reference to FIG. 25 may be performed, but not limited to, in the processor 102 and 202 and/or the transceiver 106 and 206 of FIG. 24. Hardware elements illustrated in FIG. 25 may be configured in the processor 102 and 202 and/or the transceiver 106 and 206 of FIG. 24. For example, blocks 1010 to 1060 may be configured in the processor 102 and 202 of FIG. 24. Alternatively, blocks 1010 to 1050 may be configured in the processor 102 and 202 of FIG. 24, and a block 1060 may be configured in the transceiver 106 and 206 of FIG. 24.

A codeword may be converted into a radio signal via the signal processing circuit 1000 of FIG. 25. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 25. For example, a wireless device (e.g., 100 and 200 of FIG. 24) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 26:
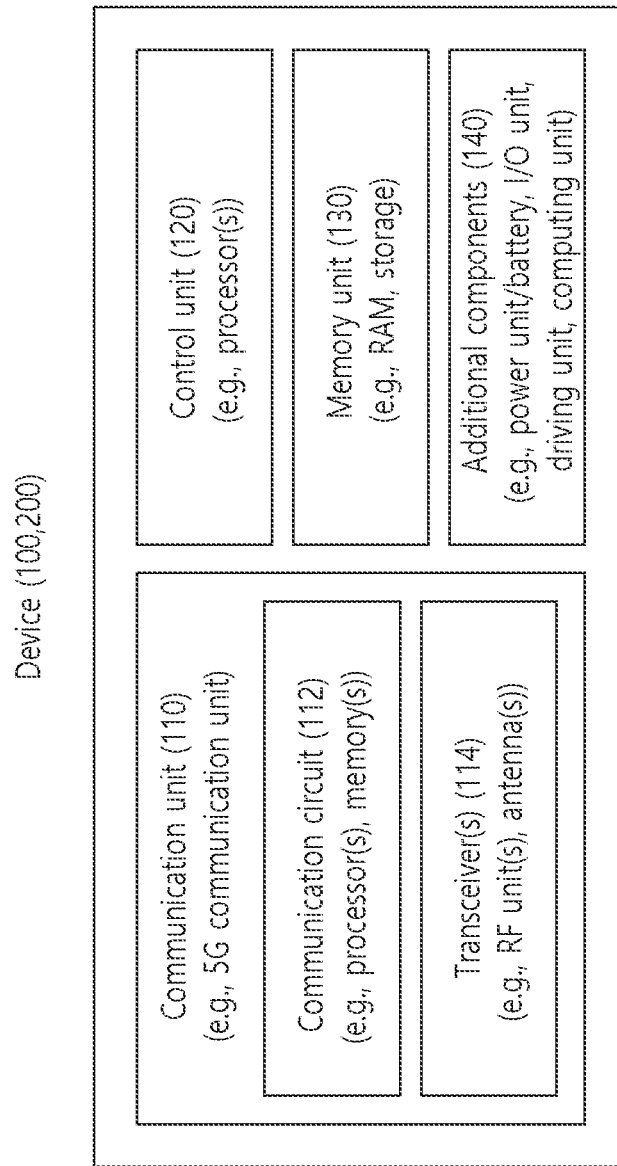
FIG. 26 illustrates another example of a wireless device applied to the disclosure.

FIG. 26 illustrates another example of a wireless device applied to the disclosure. The wireless device may be configured in various forms depending on usage/service. Referring to FIG. 26, the wireless devices 100 and 200 may correspond to the wireless device 100 and 200 of FIG. 24 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 24. For example, the transceiver(s) 114 may include the at least one transceiver 106 and 206 and/or the at least one antenna 108 and 208 of FIG. 24. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100*a* in FIG. 23), a vehicle (100 *b*-1 or 100 *b*-2 in FIG. 23), an XR device (100 *c* in FIG. 23), a hand-held device (100 *d* in FIG. 23), a home appliance (100*e* in FIG. 23), an IoT device (100*f* in FIG. 23), a terminal for digital broadcasting, a hologram device, a public safety device, an MTC device, a medical device, a fintech device (or financial device), a security device, a climate/environmental device, an AI server/device (400 in FIG. 23), a base station (200 in FIG. 23), a network node, or the like. The wireless device may be mobile or may be used in a fixed place depending on usage/service.

In FIG. 26, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 26 is described in detail with reference to the accompanying drawing.

Figure 27:
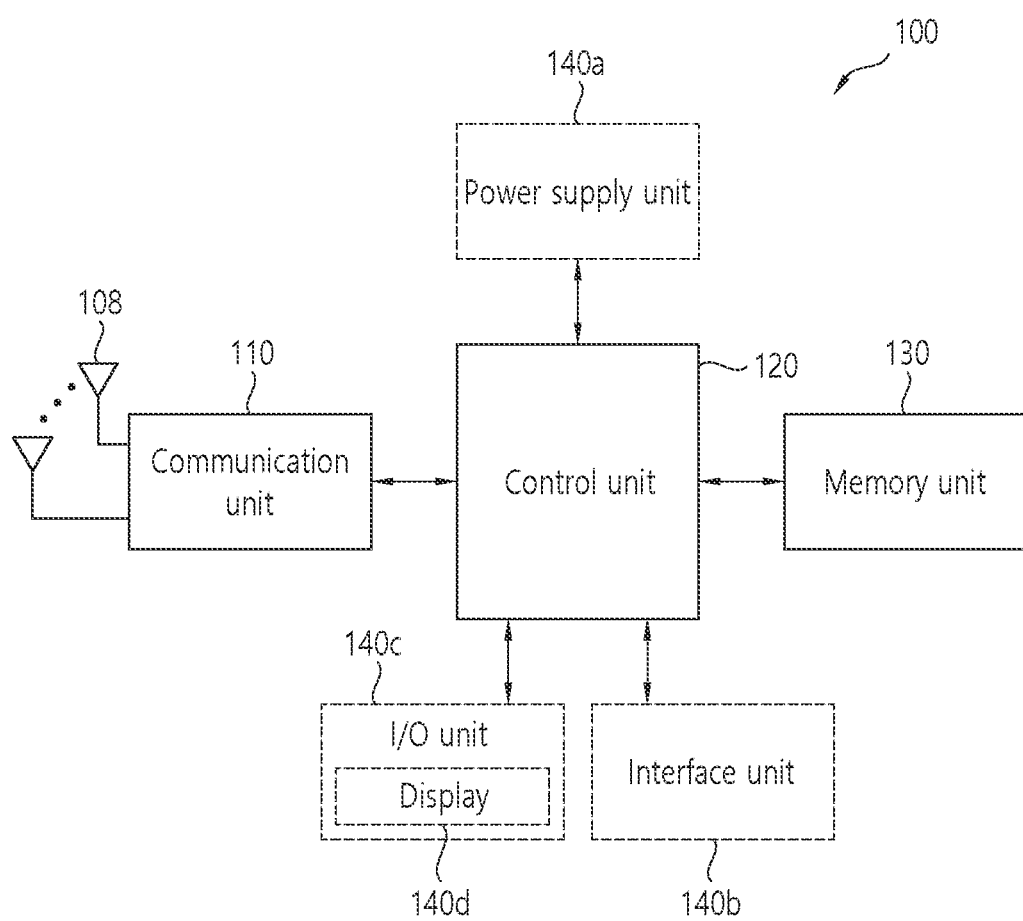
FIG. 27 illustrates a hand-held device applied to the disclosure.

FIG. 27 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 27, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 26, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 28:
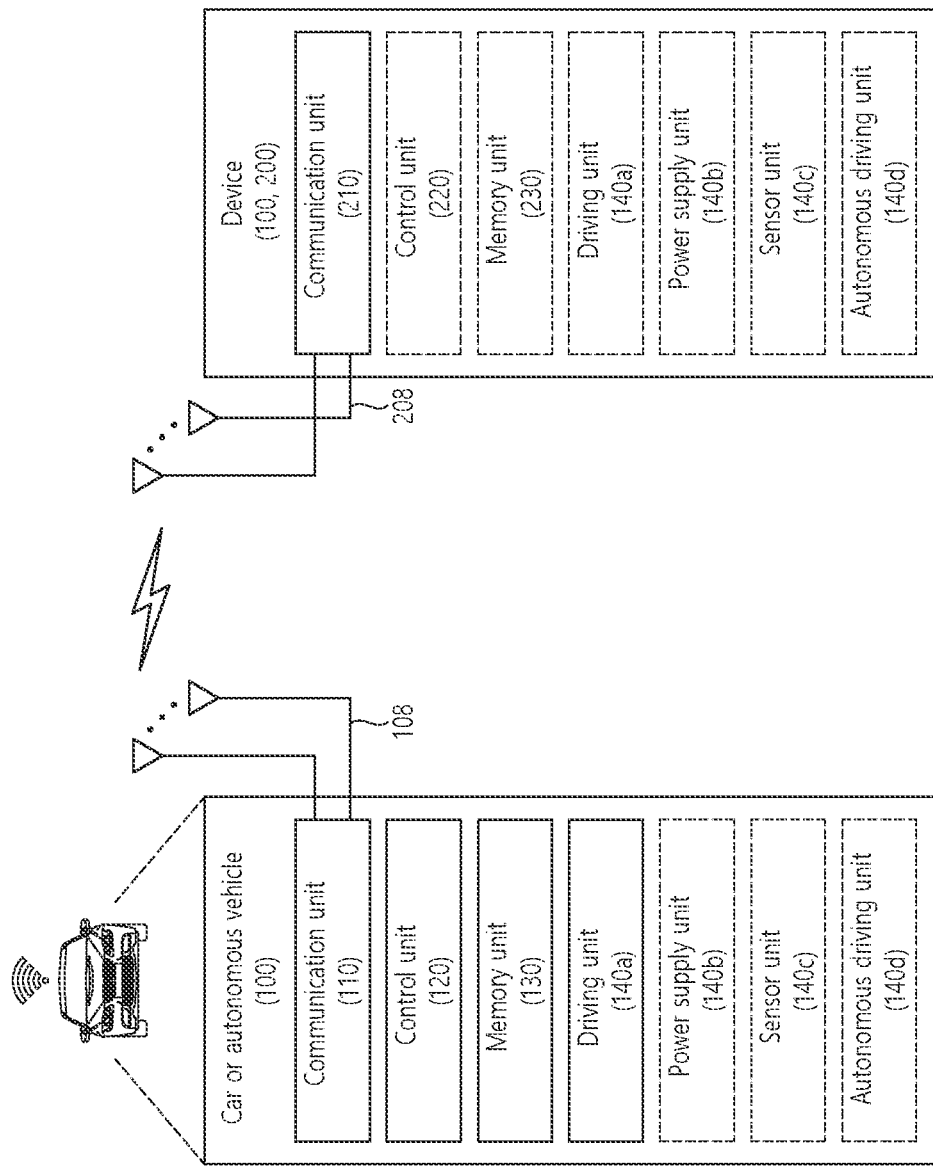
FIG. 28 illustrates a vehicle or an autonomous driving vehicle applied to the disclosure.

FIG. 28 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 28, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 26, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehiclular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140*c* may obtain a vehicle condition and environmental information. The autonomous driving unit 140*d* may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 29:
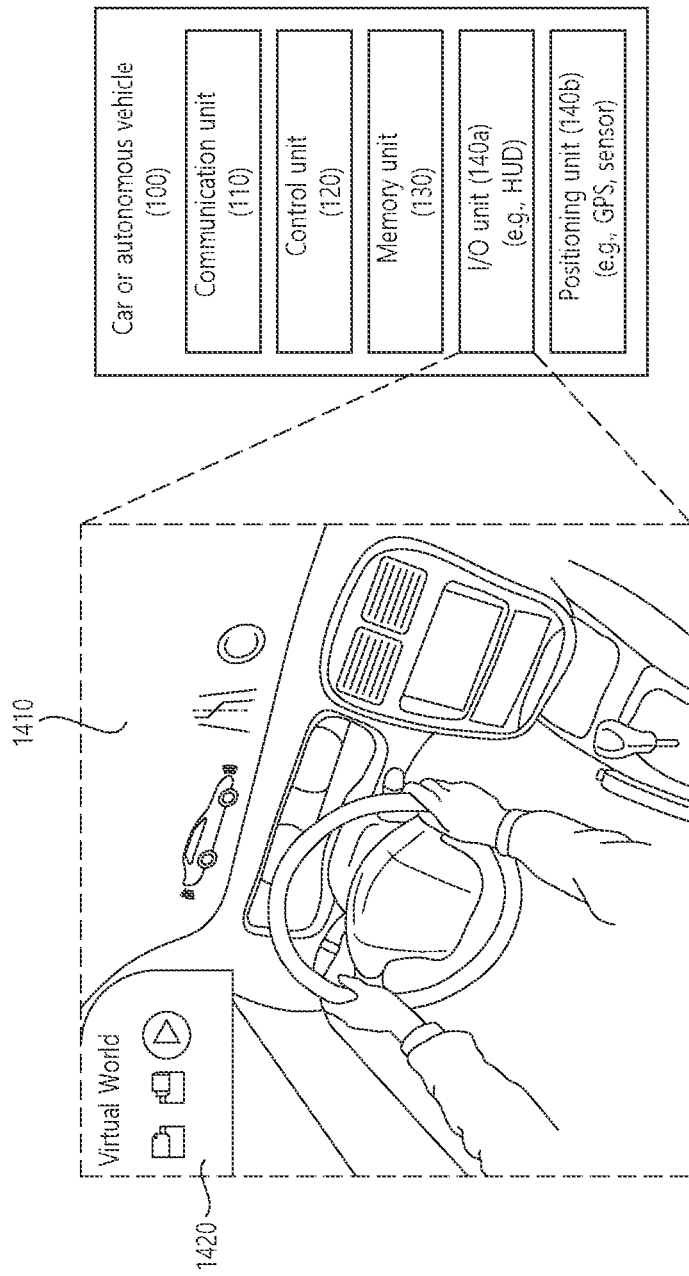
FIG. 29 illustrates a vehicle applied to the disclosure.

FIG. 29 illustrates a vehicle applied to the disclosure. The vehicle may be implemented as a means of transportation, a train, an air vehicle, a ship, and the like.

Referring to FIG. 29, the vehicle 100 may include a communication unit 110, a control unit 120, a memory unit 130, an input/output unit 140*a*, and a positioning unit 140*b*. Herein, blocks 110 to 130/140*a* to 140*b* correspond to block 110 to 130/140 of FIG. 26, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140*a* may output an AR/VR object based on information in the memory unit 130. The input/output unit 140*a* may include a HUD. The positioning unit 140*b* may acquire position information of the vehicle 100. The location information may include absolute location information of the vehicle 100, location information within a driving line, acceleration information, location information with a neighboring vehicle, and the like. The positioning unit 140*b* may include a GPS and various sensors.

For example, the communication unit 110 of the vehicle 100 may receive map information, traffic information, and the like from an external server and store it in the memory unit 130. The positioning unit 140*b* may obtain vehicle position information through GPS and various sensors and store it in the memory unit 130. The control unit 120 may generate a virtual object based on map information, traffic information, vehicle location information, and the like, and the input/output unit 140*a* may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140*a*. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 30:
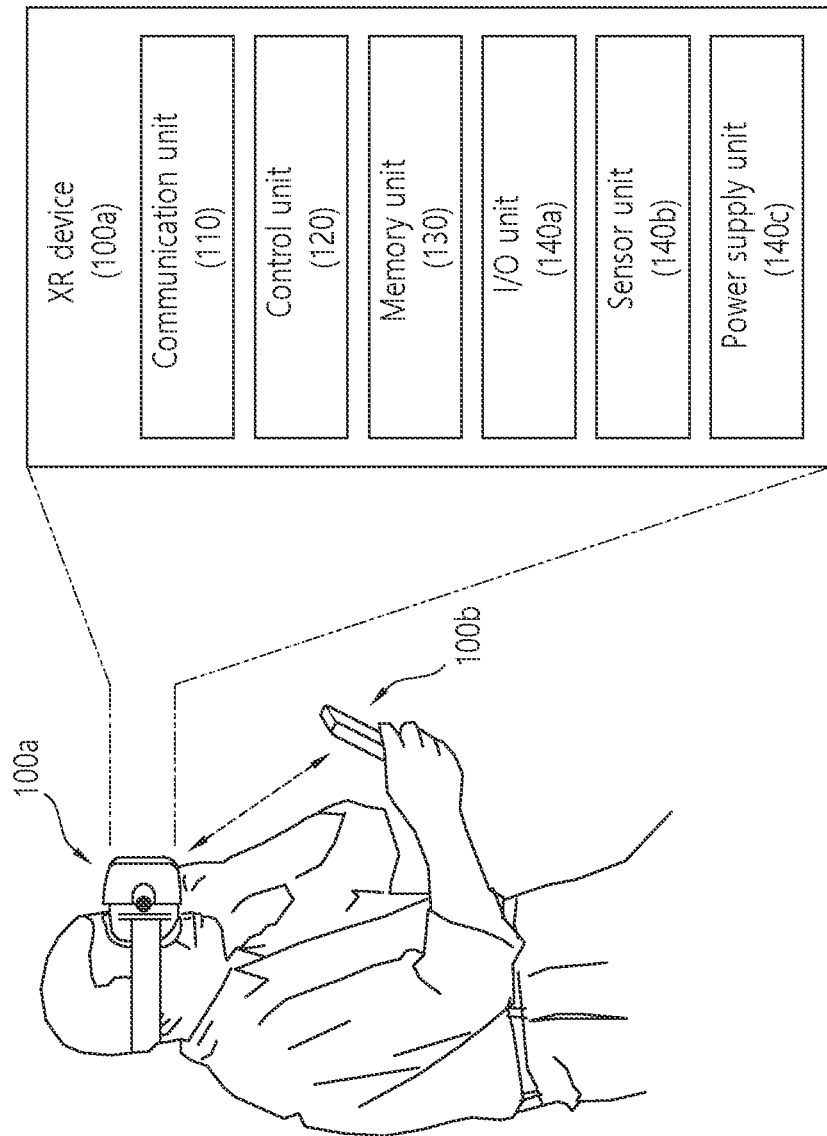
FIG. 30 illustrates a XR device applied to the disclosure.

FIG. 30 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 30, the XR device 100*a* may include a communication unit 110, a control unit 120, a memory unit 130, an input/output unit 140*a*, a sensor unit 140*b* and a power supply unit 140*c*. Herein, blocks 110 to 130/140*a* to 140*c* correspond to blocks 110 to 130/140 in FIG. 26.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100*a* to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100*a*/creating an XR object. The input/output unit 140*a* may obtain control information, data, and the like from the outside, and may output the generated XR object. The input/output unit 140*a* may include a camera, a microphone, a user input unit, a display unit, a speaker, and/or a haptic module. The sensor unit 140*b* may obtain an XR device state, surrounding environment information, user information, and the like. The sensor unit 140*b* may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140*c* supplies power to the XR device 100*a*, and may include a wired/wireless charging circuit, a battery, and the like.

For example, the memory unit 130 of the XR device 100*a* may include information (e.g., data, etc.) necessary for generating an XR object (e.g., AR/VR/MR object). The input/output unit 140*a* may obtain a command to operate the XR device 100*a* from the user, and the control unit 120 may drive the XR device 100*a* according to the user's driving command. For example, when the user wants to watch a movie or news through the XR device 100*a*, the control unit 120 transmits the content request information through the communication unit 130 to another device (e.g., the mobile device 100*b*) or can be sent to the media server. The communication unit 130 may download/stream contents such as movies and news from another device (e.g., the portable device 100*b*) or a media server to the memory unit 130. The control unit 120 controls and/or performs procedures such as video/image acquisition, (video/image) encoding, and metadata generation/processing for the content, and is acquired through the input/output unit 140*a*/the sensor unit 140*b* An XR object can be generated/output based on information about one surrounding space or a real object.

Also, the XR device 100*a* is wirelessly connected to the portable device 100*b* through the communication unit 110, and the operation of the XR device 100*a* may be controlled by the portable device 100*b*. For example, the portable device 100*b* may operate as a controller for the XR device 100*a*. To this end, the XR device 100*a* may obtain 3D location information of the portable device 100*b*, and then generate and output an XR object corresponding to the portable device 100*b*.

Figure 31:
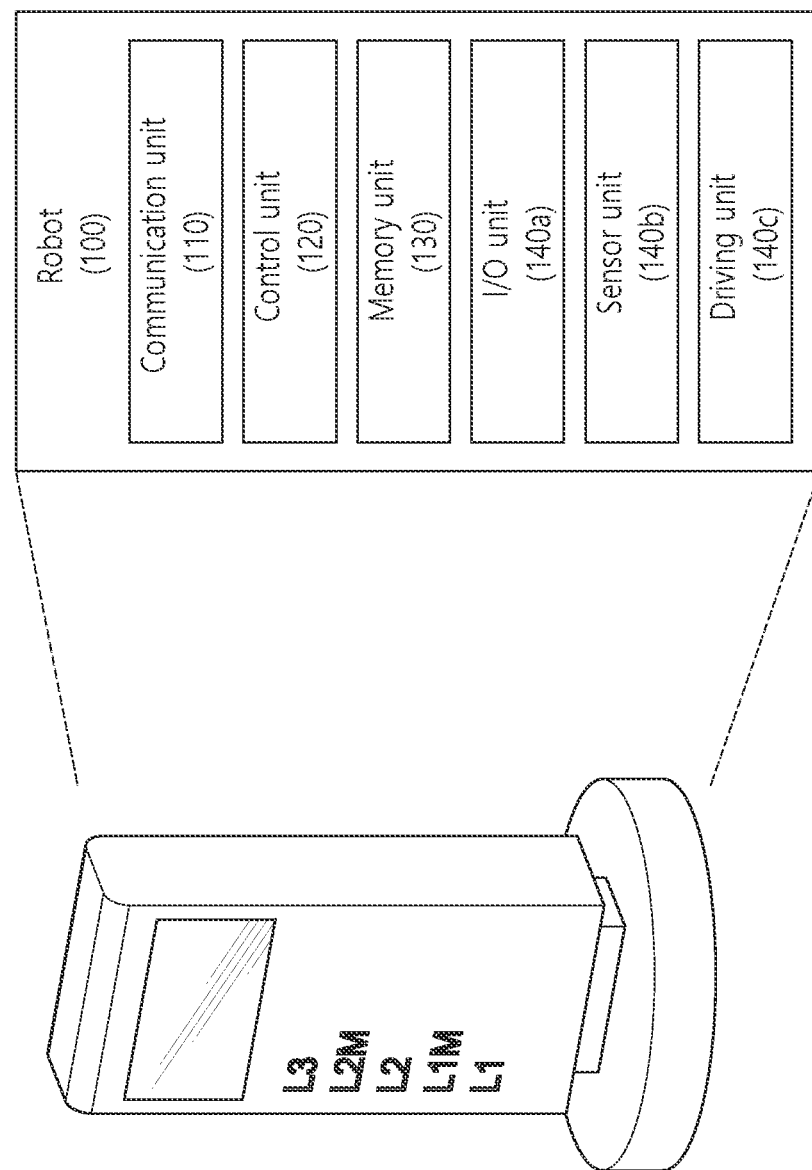
FIG. 31 illustrates a robot applied to the disclosure.

FIG. 31 illustrates a robot applied to the disclosure. The robot may be classified into industrial, medical, home, military, and the like depending on the purpose or field of use.

Referring to FIG. 31, the robot 100 may include a communication unit 110, a control unit 120, a memory unit 130, an input/output unit 140*a*, a sensor unit 140*b*, and a driving unit 140c. Herein, blocks 110 to 130/140a to 140c correspond to blocks 110 to 130/140 in FIG. 26.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140a may obtain information from the outside of the robot 100 and may output information to the outside of the robot 100. The input/output unit 140a may include a camera, a microphone, an user input unit, a display unit, a speaker, and/or a haptic module, etc. The sensor unit 140b may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may make the robot 100 travel on the ground or fly in the air. The driving unit 140c may include an actuator, a motor, a wheel, a brake, a propeller, and the like.

Figure 32:
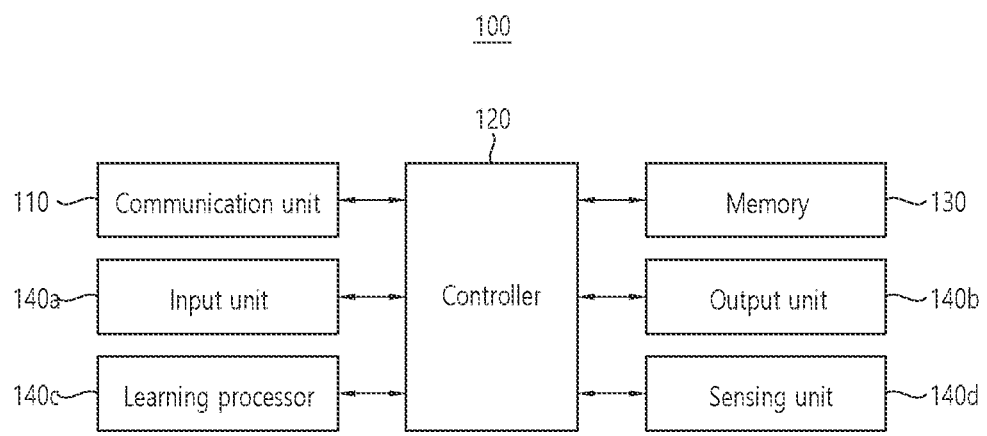
FIG. 32 illustrates an AI device applied to the disclosure.

FIG. 32 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 32, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 26, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 23) or an AI server (e.g., 400 in FIG. 23) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 23). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 23). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method comprising:
   transmitting, by a base station (BS) to a user equipment (UE) for which a primary cell and secondary cells (SCells) are configured, information for search spaces to monitor physical downlink control channel (PDCCH) for detection of downlink control information (DCI);
   transmitting, by the BS to the UE, bandwidth part (BWP) information via a radio resource control (RRC) signal, wherein the BWP information informs of a specific BWP;
   transmitting, by the BS to the UE, the DCI including a first field related to resource assignment for a specific cell and a second field related to a secondary cell dormancy for a group of configured SCells; and
   receiving, by the BS from the UE, Hybrid Automatic Repeat and request-acknowledgement (HARQ-ACK) information related with the DCI,
   wherein based on a current active BWP for the UE being a dormant BWP, the specific BWP informed by the BWP information is activated for each activated SCell in the group of configured SCells based on a value of a bit related with the group of configured SCells in the second field included in the DCI being 1.

2. The method of claim 1, wherein the DCI is transmitted on the primary cell.

3. The method of claim 1, wherein the DCI indicates non-dormancy in units of a plurality of cells.

4. The method of claim 1, wherein a maximum number of configurable BWPs per cell configured for the UE is four.

5. The method of claim 1, wherein at least one of a physical downlink shared channel (PDSCH) or a physical downlink control channel (PDCCH) is transmitted on the specific BWP.

6. The method of claim 1, wherein the dormant BWP is a BWP configured by a higher layer signaling.

7. The method of claim 1, wherein the primary cell is a cell in which the UE performs an initial connection establishment procedure or a connection re-establishment procedure, and the secondary cell is a cell in which additional radio resources are provided to the UE.

8. A base station (BS), comprising:
   at least one memory;
   at least one transceiver; and
   at least one processor operably connectable to the at least one transceiver and the at least one memory,
   wherein the at least one memory stores instructions that, based on being executed by the at least one processor, cause the at least one processor to perform operations comprising:
   transmitting, by the BS to a user equipment (UE) for which a primary cell and secondary cells (SCells) are configured, information for search spaces to monitor physical downlink control channel (PDCCH) for detection of downlink control information (DCI);
   transmitting, to the UE, bandwidth part (BWP) information via a radio resource control (RRC) signal, wherein the BWP information informs of a specific BWP;
   transmitting, to the UE, the DCI including a first field related to resource assignment for a specific cell and a second field related to a secondary cell dormancy for a group of configured SCells, and
   receiving, from the UE, Hybrid Automatic Repeat and request-acknowledgement (HARQ-ACK) information related with the DCI,
   wherein based on a current active BWP for the UE being a dormant BWP, the specific BWP informed by the BWP information is activated for each activated SCell in the group of configured SCells based on a value of a bit related with the group of configured SCells in the second field included in the DCI being 1.

9. The BS of claim 8, wherein the DCI is transmitted on the primary cell.

10. The BS of claim 8, wherein the DCI indicates non-dormancy in units of a plurality of cells.

11. The BS of claim 8, wherein a maximum number of configurable BWPs per cell configured for the UE is four.

12. The BS of claim 8, wherein at least one of a physical downlink shared channel (PDSCH) or a physical downlink control channel (PDCCH) is transmitted on the specific BWP.

13. The BS of claim 8, wherein the dormant BWP is a BWP configured by a higher layer signaling.

14. The BS of claim 8, wherein the primary cell is a cell in which the UE performs an initial connection establishment procedure or a connection re-establishment procedure, and the secondary cell is a cell in which additional radio resources are provided to the UE.

15. An apparatus comprising:
   at least one memory; and
   at least one processor operably connectable to the at least one memory,
   wherein the at least one memory stores instructions that, based on being executed by the at least one processor, cause the at least one processor to perform operations comprising:
   transmitting, by a base station (BS) to a user equipment (UE) for which a primary cell and secondary cells (SCells) are configured, information for search spaces to monitor physical downlink control channel (PDCCH) for detection of downlink control information (DCI);
   transmitting, to the UE, bandwidth part (BWP) information via a radio resource control (RRC) signal, wherein the BWP information informs of a specific BWP;
   transmitting, to the UE, the DCI including a first field related to resource assignment for a specific cell and a second field related to a secondary cell dormancy for a group of configured SCells, and
   receiving, from the UE, Hybrid Automatic Repeat and request-acknowledgement (HARQ-ACK) information related with the DCI,
   wherein based on a current active BWP for the UE being a dormant BWP, the specific BWP informed by the BWP information is activated for each activated SCell in the group of configured SCells based on a value of a bit related with the group of configured SCells in the second field included in the DCI being 1.

* * * * *